United States Patent [19]

Sugiura

[11] Patent Number: 5,592,310
[45] Date of Patent: Jan. 7, 1997

[54] IMAGE PROCESSING METHOD AND APPARATUS

[75] Inventor: Takashi Sugiura, Kawasaki, Japan

[73] Assignee: Canon Kabushiki Kaisha, Tokyo, Japan

[21] Appl. No.: 345,327

[22] Filed: Nov. 21, 1994

Related U.S. Application Data

[63] Continuation of Ser. No. 888,586, May 26, 1992, abandoned.

[30] Foreign Application Priority Data

May 29, 1991 [JP] Japan .................................. 3-124338

[51] Int. Cl.$^6$ ...................................................... H04N 1/46
[52] U.S. Cl. .......................... 358/501; 358/518; 358/523; 358/530; 358/534
[58] Field of Search ............................... 358/501, 518, 358/523, 530, 534

[56] References Cited

U.S. PATENT DOCUMENTS

| | | | |
|---|---|---|---|
| 4,308,553 | 12/1981 | Roetling | 358/534 |
| 4,369,461 | 1/1983 | Tamura | 358/500 |
| 4,688,031 | 8/1987 | Haggerty | 340/793 |
| 4,958,217 | 9/1990 | Kimura et al. | 358/75 |
| 5,121,230 | 6/1992 | Honma et al. | 358/75 |
| 5,408,343 | 4/1995 | Sugiura et al. | 358/518 |
| 5,444,556 | 8/1995 | Ito et al. | 358/501 |

FOREIGN PATENT DOCUMENTS 63-177221  7/1988  Japan .

*Primary Examiner*—Edward L. Coles, Sr.
*Assistant Examiner*—Thomas L. Stoll
*Attorney, Agent, or Firm*—Fitzpatrick, Cella, Harper & Scinto

[57] ABSTRACT

An image processing method and apparatus which inputs a color image signal, and generates and outputs pattern data corresponding to the color of the image signal. The color of each pixel of the input color image signal is discriminated by a color discrimination circuit and the pattern data which corresponds to the color is output from the pattern generation circuit according to the result of discrimination. The brightness of the pattern data is adjusted according to a shift, which is the difference between the discriminated color and the color of the pixel. In the instance where the discriminated color is different from the predetermined color, or the proper color is not discriminated, the brightness signal of the pixel data is output as is. In this way, the coexistence of the pattern data at the border of the colors is de-emphasized.

22 Claims, 20 Drawing Sheets

RED :

YELLOW :

BLUE :

GREEN :

BROWN :

ORANGE :

IMAGE PROCESSING METHOD AND APPARATUS

This application is a continuation, of application Ser. No. 07/888,586 filed May 26, 1992, now abandoned.

BACKGROUND OF THE INVENTION

1. Field of the Invention

The present invention relates to an image processing method and apparatus, and more particularly to an image processing method and apparatus which is applicable to a printer, digital copier or facsimile which prints image data from an image scanner, a computer or the like.

2. Description of the Related Arts

In a conventional digital copier, an original image is irradiated by a light source such as a halogen lamp and the reflection of the original image is read by a solid image pickup device such as a CCD (charge coupled device). The image signal which was photoelectrically transformed by the solid image pickup device is further transformed into a digital signal. After a predetermined correction processing is performed on the digital signal, the corrected image signal is output to a printer, a laser beam printer, thermal printer, or ink jet printer. Thus, the recording image is formed on a recording medium such as recording paper.

Since there is a case of copying a color original image by a monochrome digital copier, the image output of the color image is required to carry more information than the output of a black and white image. To copy such an image, a digital full-color copier and a one-point color copier capable of copying a multiple-color image in color have been developed.

On the other hand, in the case where a color image is read and the image data is output by the recording apparatus and printed in black and white, there is a copier which reads the color image by a color sensor, and the color of the original image is discriminated, and the pattern data corresponding to each color is output on the basis of the result of color discrimination. Thus, art in which the duplication is produced in a manner such that the difference of colors in the original image is expressed by the difference of the printed patterns is known.

However, in the above described apparatus which discriminates colors of an original image and duplicates the image by generating pattern data corresponding to the discriminated color, there is a drawback in that the printed result is not clear because, in the point where two colors are mixed or the gradation area where colors are continuously changing, the two kinds of patterns coexist at the changing point. This type of problem cannot be ignored when a color is incorrectly discriminated, particularly when a shift of color reading position has occurred in a scanner.

SUMMARY OF THE INVENTION

Accordingly, it is an object of the present invention to provide an image processing method and apparatus which de-emphasizes the coexistence of patterns in a color changing part of a color original image.

It is another object of the present invention to provide an image processing method and apparatus capable of avoiding the coexistence of patterns in the color changing part and outputting the patternized color of the original image.

It is another object of the present invention to provide an image processing method and apparatus which de-emphasizes the coexistence of patterns in the color changing part.

It is another object of the present invention to provide an image processing method and apparatus capable of automatically adding an edge to a area where colors are changing.

It is another object of the present invention to improve a monochrome image formation apparatus in which lack of color information is reduced.

It is another object of the present invention to perform various image processing in real time.

According to the present invention, the foregoing objects are attained by providing an image processing apparatus which inputs a color image signal, and generates and outputs pattern data corresponding to the color of the color image signal, comprising: color discrimination means for inputting a color image signal and discriminating the colors of the color image signal; pattern generation means for generating a pattern which is predetermined to correspond to the color discrimination signal from the color discrimination means; and brightness conversion means for converting the brightness of the pattern in accordance with the result of the color discrimination.

Furthermore, according to the present invention, the foregoing objects are attained by providing an image processing method which inputs a color image signal, and generates and outputs pattern data corresponding to the color of an image signal, comprising the steps of: inputting the color image signal and discriminating the color of the color image signal; generating the predetermined pattern corresponding to every color; and converting the brightness of the pattern according to the result of the color discrimination of the color image signal.

Other features and advantages of the present invention will be apparent from the following description taken in conjunction with the accompanying drawings, in which like reference characters designate the same or similar parts throughout the figures thereof.

DESCRIPTION OF THE PREFERRED EMBODIMENTS

Preferred embodiments of the present invention will now be described in detail in accordance with the accompanying drawings.

Figure 1A:
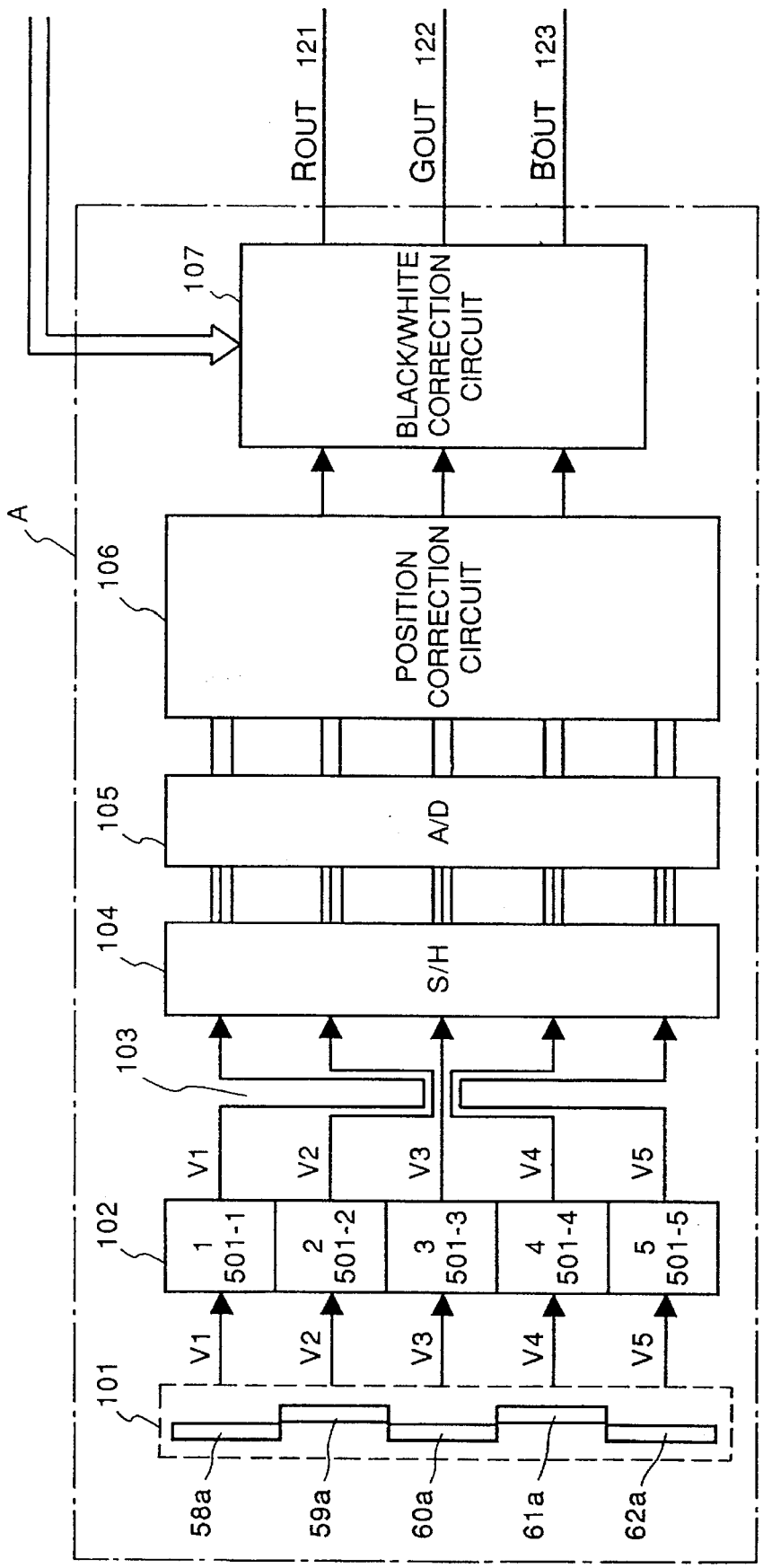
FIGS. 1A and 1B are block diagrams illustrating the circuit construction of an image processing apparatus of a digital copier according to a first embodiment of the invention.
Figure 1B:
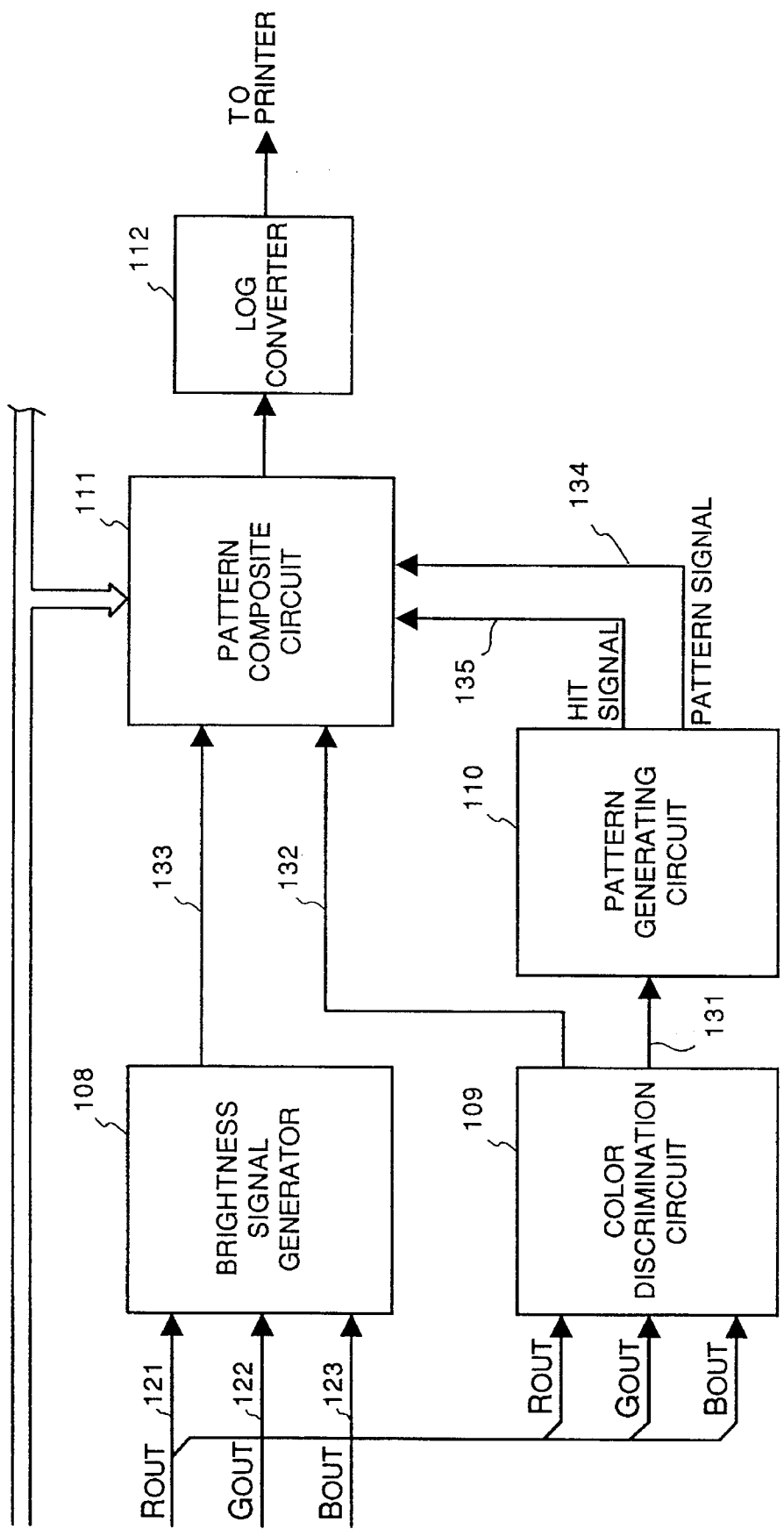

FIGS. 1A and 1B are block diagrams illustrating the circuit construction of the image processing apparatus of the digital copier according to the present embodiment.

In FIG. 1A, numeral 101 refers to a CCD (charge coupled device), an image sensor (color reading sensor), for converting the color original image, which is formulated on the image reading face of the CCD 101 using color separation filters, into electrical signals of G (green), B (blue), and R (red) through an optical system such as a rod lens. The numeral 102 refers to an amplifying circuit which amplifies the image output signal from the CCD 101, which amplified image signal is output to a coaxial cable 103. The numeral 104 refers to a S/H (sample and hold) circuit which performs a S/H on the color image signal outputted from the amplifying circuit 102 through the coaxial cable 103, and outputs the S/H signal as a color signal of G, B, and R. The numeral 105 refers to an A/D (analog/digital) conversion circuit which converts the analog color image signal on which the S/H is performed in the S/H circuit 104 into a digital color image signal. The numeral 106 refers to a position correction circuit which electrically corrects the reading position of each channel of the CCD 101, and the numeral 107 refers to a black/white correction circuit which performs black level correction and white level correction (shading correction), to be described later, on the digital image signal.

In FIG. 1B, numeral 108 refers to a brightness signal generator which generates brightness signals from the digital color image signal in which the black and white corrections have been processed. The numeral 109 refers to a color discrimination circuit which discriminates the color of each pixel of the digital color image in which the black and white corrections have been processed. According to the present embodiment, the color discrimination circuit outputs the color discrimination signal 131 according to the hue signal and the shift signal 132 which indicates a shift from the center of a discrimination range (shift from the representative value of the hue). The numeral 110 refers to a pattern generation circuit comprising a storage medium of a RAM or ROM which outputs a predetermined pattern corresponding to each color in accordance with the result of color discrimination by the color discrimination circuit 109. In the present embodiment, the pattern generation circuit 110 is set to recognize the color discrimination signal 131 corresponding to the hue signal as a reading address and to output a pattern which is stored in the memory in advance.

The numeral 111 refers to a pattern composite circuit which outputs either the brightness signal 133 generated in the brightness signal generator 108 according to the HIT signal 135 or the pattern signal 134, indicating what color is generated from the pattern generation circuit 110, which is converted according to the shift signal 132. The numeral 112 refers to a LOG convertor which converts a brightness signal from the pattern composite circuit 111 into the density signal and outputs the density signal to a connected printer. Furthermore, section A in FIG. 1A, which is enclosed by a chain line, corresponds to the video image processing circuit of the image reader (image scanner).

In the digital copier according to the present embodiment, a full-color original image is exposed by a light source such as a halogen lamp or fluorescent lamp (not shown) and the reflected color image from the color original image is picked up by a color image sensor such as CCD. Then, an analog image signal which is obtained by the image sensor is digitized by a A/D convertor. The printed image is obtained in a manner such that after the digitized full-color image signal has been processed, the signal is output to a image forming apparatus such as a thermal printer, ink jet printer, or laser beam printer (not shown). The detailed process is described below. The ink jet printer here includes a so-called bubble jet printer as shown in U.S. Pat. No. 4,723,129.

First, the color original is irradiated by an exposure lamp (not shown) and reflected light from original is separated into RGB by the color separation filers. Then, the signal is input into the color reading sensor 101 and is amplified to a predetermined level by the amplifying circuit 102. The CCD 101 is driven by a clock signal which was generated by the system pulse generator (not shown).

Figure 2:
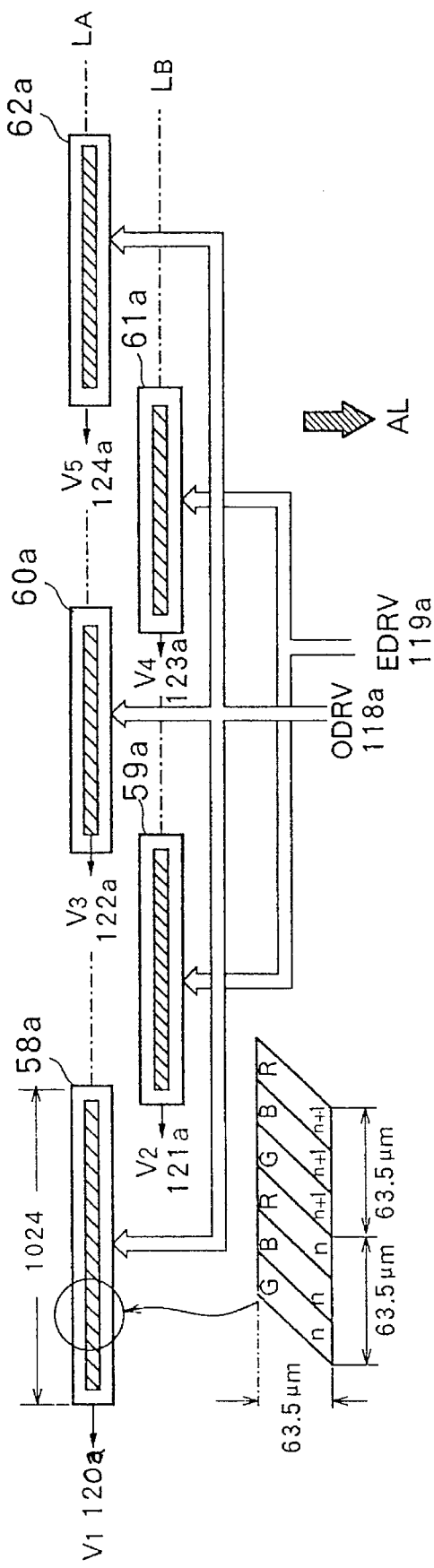
FIG. 2 is a diagram illustrating the construction of a CCD sensor.
Figure 3:
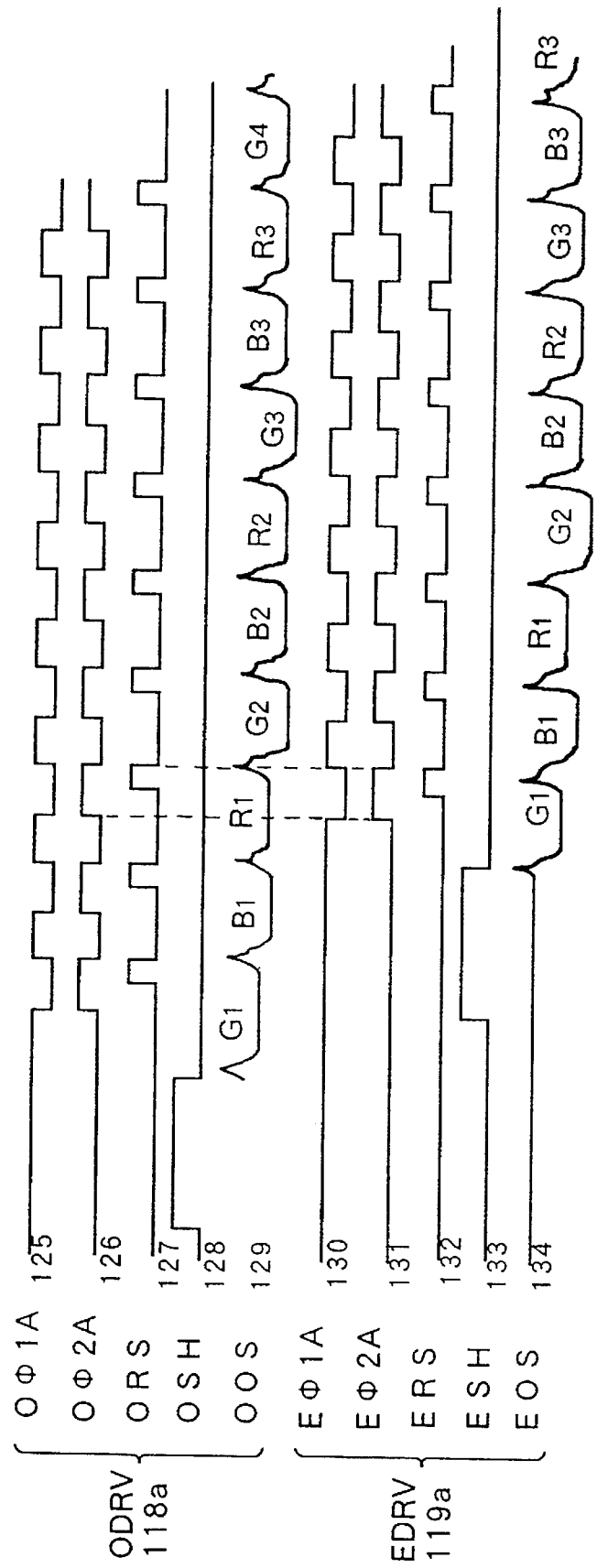
FIG. 3 is a timing chart of a CCD driving pulse signal.

FIG. 2 is a diagram illustrating the arrangement of each sensor tip (sensor device) of the color reading sensor 101 and FIG. 3 illustrates the timing of the driving pulse of each sensor device.

In FIG. 2, the sensor 101 comprises five sensor devices which are arranged in zigzags to read data in a manner such that the main scanning direction is divided into five parts. In each sensor device, 63.5 μm is predetermined as one pixel and the pixel data for 1024 pixels can be read at a density of 400 dpi (dot/inch). Furthermore, as shown in FIG. 2, one pixel is divided into three parts, in the order of G, B, and R, in the main scanning direction. Thus, each sensor device comprises 3072 (1024×3) effective pixels in total. On the other hand, each sensor device 58a–62a is formed on a single ceramic substrate. It is arranged so that the first (1st), third (3rd), and fifth (5th) devices of the sensor 101 (58a, 60a, 62a) are formed on the line LA and the second (2nd) and fourth (4th) devices (59a, 61a) are on the line LB, which are located four lines apart from the line LA (63.5 μm×4= 254 μm). In the case where an original image is read, the image is scanned to the AL direction.

Of the five sensor devices in FIG. 2, the 1st, 3rd, and 5th devices (58a, 60a, 62a) and the 2nd and 4th devices (59a, 61a) are independently synchronized and respectively driven by the driving pulse groups ODRV (118a) and EDRV (119a).

The driving pulses of the sensor devices are now described.

As shown in FIG. 3, pulse signals O01A, O02A, and ORS included in the driving pulse group ODRV (118a), and pulse signals E01A, E02A, and ERS included in the driving pulse group EDRV (119a) are categorized as charge transfer clocks (O01A, O02A, E01A and E02A) and charge reset pulses (ORS and ERS). These pulse groups are totally synchronized and generated so that jitter will not be generated for suppression of noise and interfaces between the 1st, 3rd, and 5th devices and the second and fourth devices. For this purpose, these pulses are generated in synchronization with a clock signal from the reference oscillating source OSC (not shown).

Figure 4:
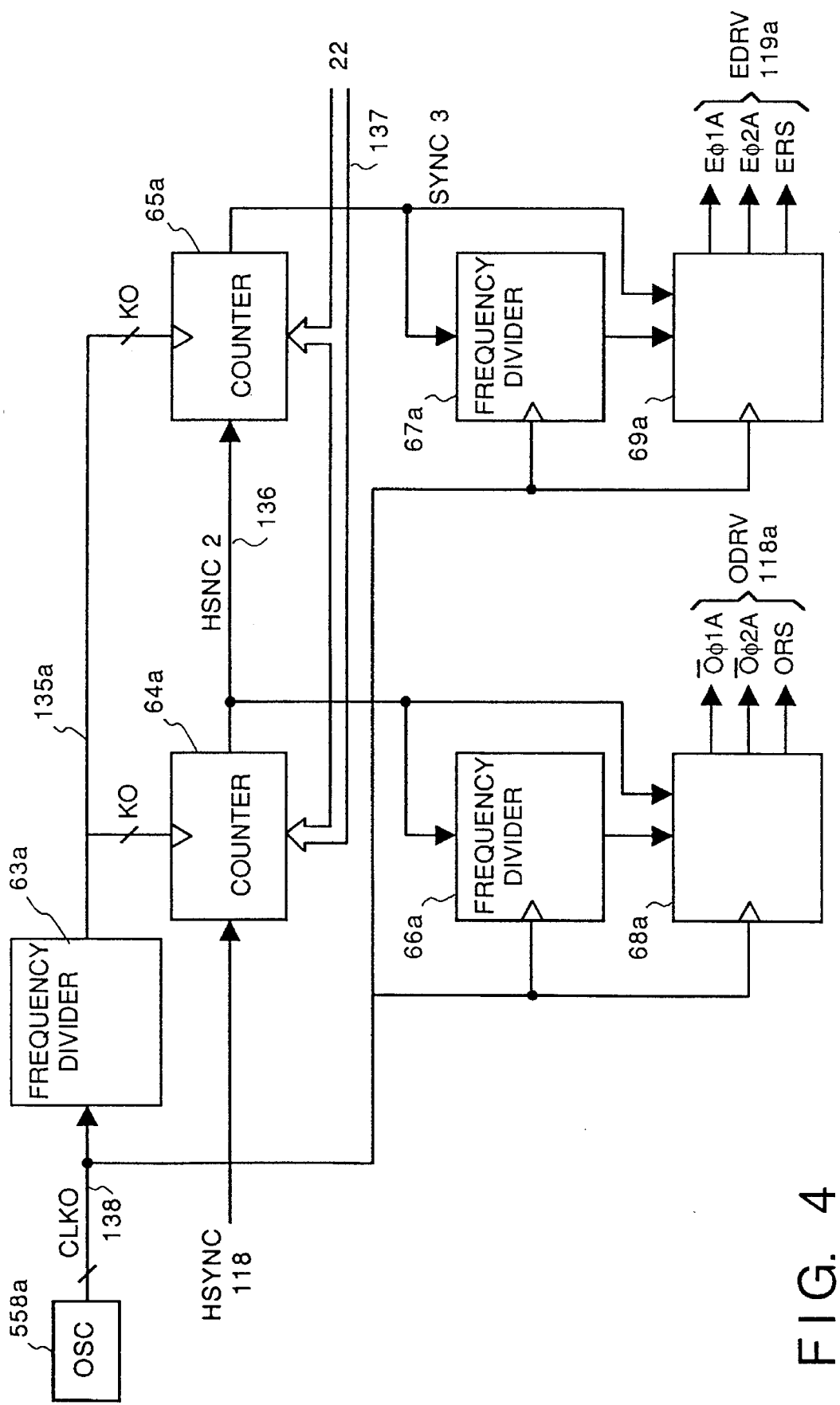
FIG. 4 is a block diagram illustrating the construction of a CCD driving pulse generation circuit.
Figure 5:
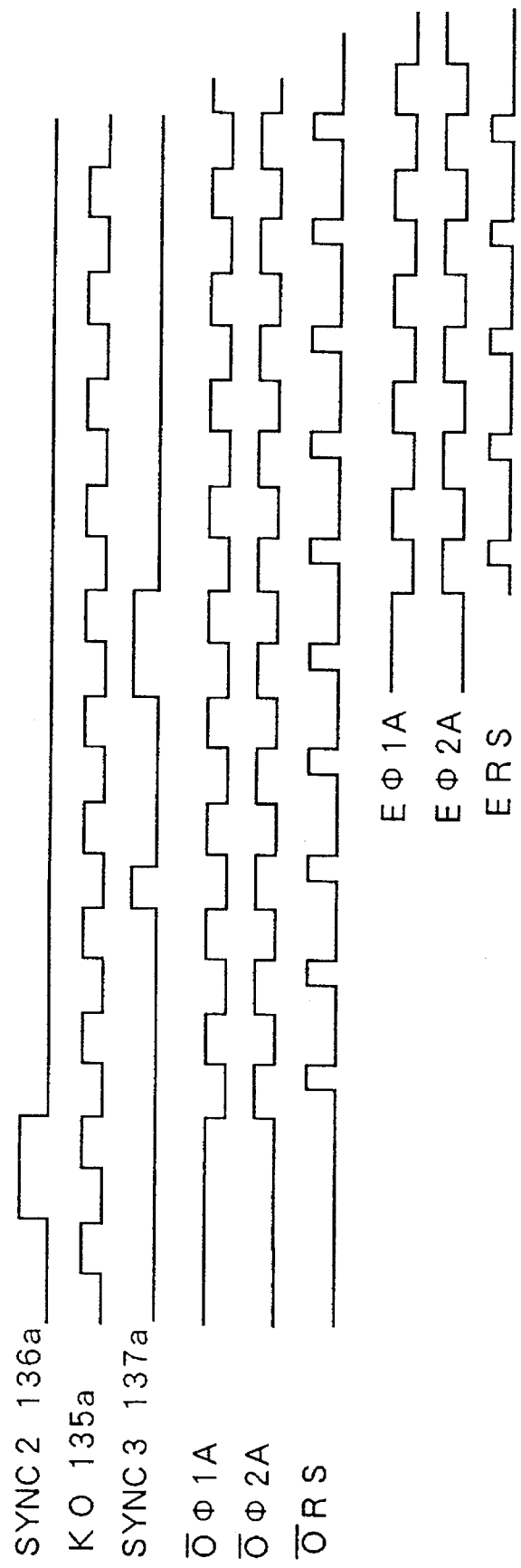
FIG. 5 is a timing chart of the CCD driving pulses.

FIG. 4 is a block diagram illustrating the construction of the circuit which generates the aforementioned driving pulse groups ODRV (118a) and EDRV (119a). FIG. 5 is a diagram illustrating the timing of the driving pulses. This circuit block is included in the system control pulse generator (not shown).

The clock KO (135a) which divides the source clock CLKO generated from a single reference oscillating source OSC (558a) is a clock signal generating the reference signals SYNC 2 and SYNC 3 which determines the timing of generating the sensor driving pulses ODRV and EDRV. The output timing of the reference signals SYNC 2 and SYNC 3 are determined according to a set value of presettable counters 64a and 65a which are set by signal line 22 connected to the CPU omnibus. Furthermore, the reference signals SYNC 2 and SYNC 3 respectively initialize a frequency divider 66a and driving pulse generator 68a, and a frequency divider 67a and driving pulse generator 69a.

That is, since the reference signals SYNC 2 and SYNC 3 refer to the horizontal synchronizing signal HSYNC (118), which is input into the present block as a standard, and are formed by the source clock CLKO which is output from the signal oscillating source OSC (558a) and frequency divider clock which is generated by synchronization, each pulse group of ODRV (118a) and EDRV (119a) is obtained as synchronized signals without jitter. The signal turbulence caused by the interface among the sensor devices (58a, 59a, 60a, 61a, and 62a) can be prevented.

The sensor driving pulse ODRV (118a) which was obtained by synchronization is supplied to the 1st, 3rd, and 5th sensor devices (58a, 60a, and 62a) and the sensor driving pulse EDRV (119a) is supplied to the 2nd and 4th sensors (59a and 61a). Each of sensor devices independently output the video signals V1–V5 by synchronization with the driving pulse. As shown in FIG. 1A, each of the video signals V1–V5 is amplified to a predetermined voltage by the amplifying circuits 501-1 through 501-5 which are independent among the channels. Each of the video signals V1–V5 are amplified to a predetermined voltage by the amplifying circuits 501-1 through 501-5 as shown in FIG. 1A. The signals of V1, V3, and V5 are transmitted at the timing of the OOS (129) and the video signals V2 and V4 are transmitted at the timing of the EOS (134) through the coaxial cable 103. The voltage signals V1–V5 are input into the S/H circuit 104 of the video image processing circuit and held therein.

As described above, the color image signals, which were obtained in a manner such that the five sensor devices read the original image by dividing it into five parts, are separated into G (green), B (blue), and R (red), and the S/H is performed on the signals in the S/H circuit 104. Therefore, the signal processing of the system 3×5=15 is performed on the signal on which the S/H has been already performed.

The analog color image signals which are sampled and held in every R, G, and B in the S/H circuit 104 are digitized in each channel of CH 1–CH 5 in the A/D conversion circuit 105. The digitized signals are output to the position correction circuit 106 independently, but in parallel.

As described above, since the CCD sensor 101 has the space for four lines (63.5 μm×4=254 μm) in the sub-scanning direction and reads the original image by zigzag type sensor devices which divide the area into five areas in the main scanning direction, the image reading position of channels CH 2 and CH 4 is shifted four lines from that of channels CH 1, CH 3, and CH 5 in the sub-scanning direction. In order to connect the image signal from each sensor device in the main scanning direction, the position correction is performed in the sub-scanning direction by the position correction circuit 106 having the memory for a plurality of lines.

Figure 6:
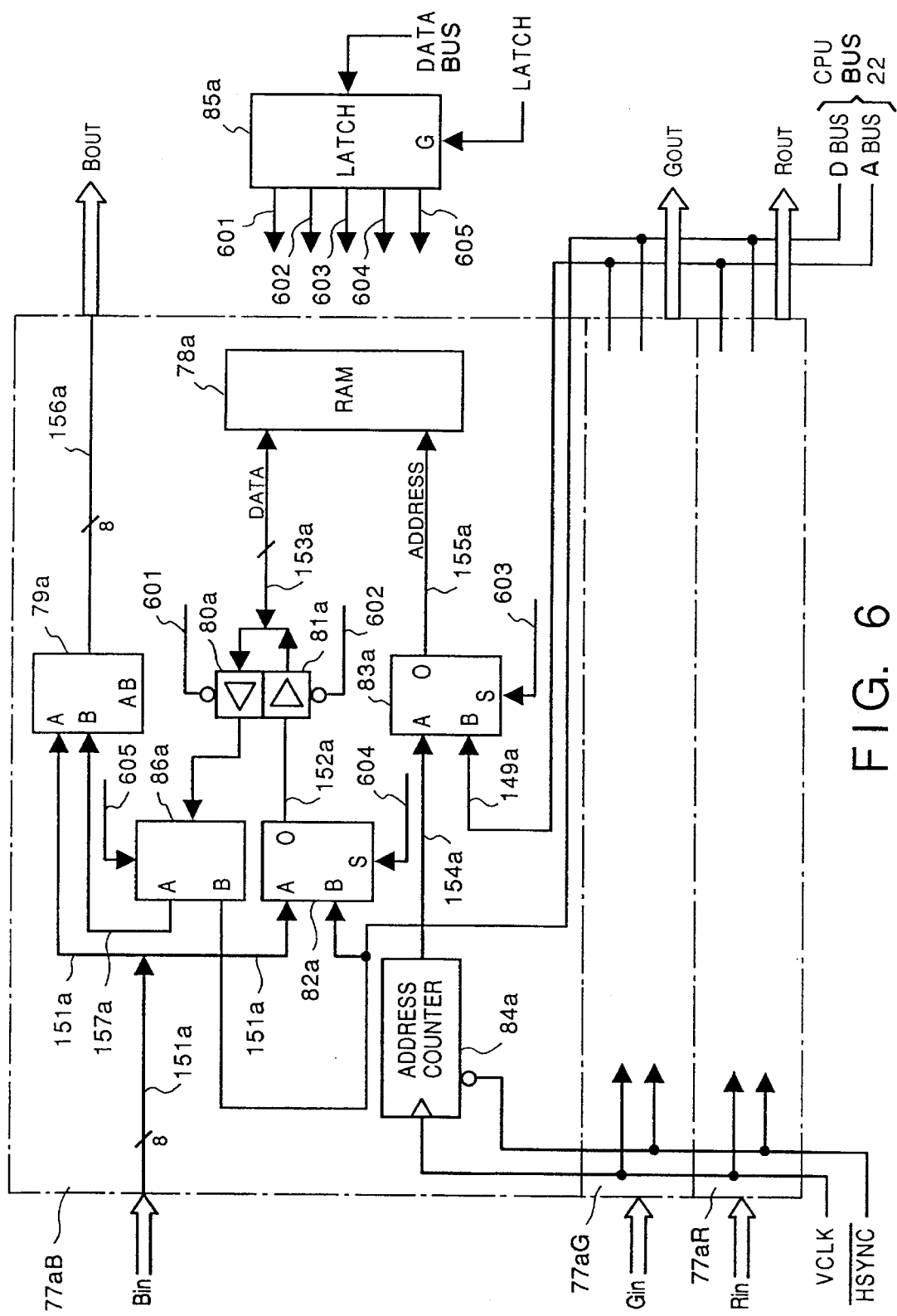
FIG. 6 is a block diagram illustrating the construction of a black correction circuit of a digital copier according to the present embodiment.
Figure 7:
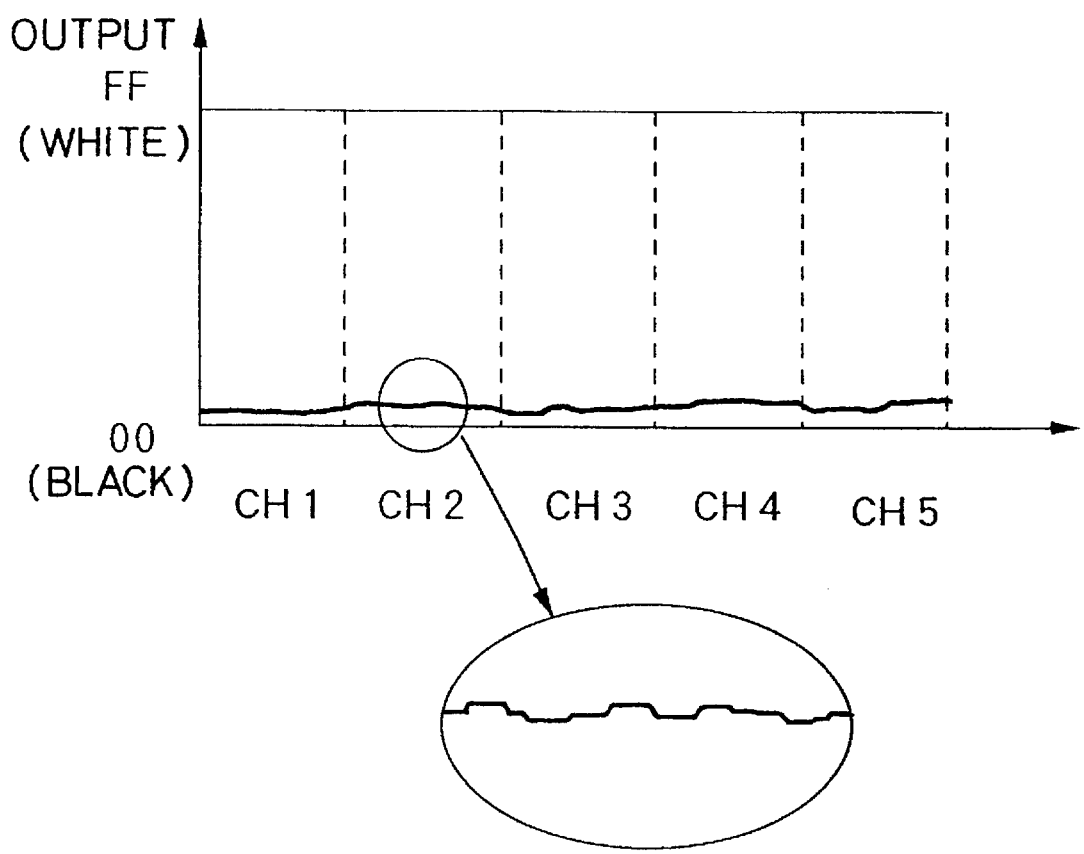
FIG. 7 is a diagram illustrating the concept of a black correction in a black correction circuit of the digital copier according to the present embodiment.

Then, the operation for black correction in the black/white circuit 107 is described along with FIGS. 6 and 7.

As shown in FIG. 7, the black level output signals of the channels CH 1–CH 5 greatly varies among the sensor devices and pixels in the case where a small quantity of light which is input to the CCD sensor 101. If such image signal is output to a printer as it is, lines and unevenness may appear in the printed image data (including patterns to be described later).

Therefore, a variation needs to be eliminated by corrections in the black/white correction circuit 107 as shown in FIG. 6. Prior to an image reading operation, the original image scanning unit is moved to the position of a black board having an even density which is arranged at the tip of the original image stand which is out of the image reading area. Successively, a halogen lamp is lit, and the black board is read, and then the black level image signal is input.

In order to describe the black correction operation in the black correction circuit 77aB for a blue signal ($B_{in}$), the operation that the image data of the black level for one line is stored in the black level RAM 78a is described first. The selector 82a selects the A input by the selection signal 604 and the gate 80a is closed by the gate signal 601, while the gate 81a is opened by the gate signal 602. That is, the data path is connected such as 151a→152a→153a. On the other hand, the address input 155a of RAM 78a is initialized by the HSYNC and the A input of the selector 83a is selected by the selection signal 603 so that the output 154a of the address counter 84a which counts VCLK is input to the selector 83a and output as the address of the RAM 78a. In this way, the black level signal for one line is stored in the RAM 78a (referred to as a black reference value reading mode).

On the other hand, in the case of reading an image, the RAM 78a operates in a data reading mode and the black level data, which was read out in every one pixel in each line of the RAM 78a, is input to the B input of the subtracter 79a via the data line 153a→157a. Then, the result of the operation (A input)−(B input) is output from the subtracter 79a. At this time, the gate 81a is closed by the gate signal 602, while the gate 80a is opened by the gate signal 601. Side A is selected by the selection signal 605 and the output is output to the side A. Therefore, to the black level data DK(i) which is stored in the RAM 78a, in the case where the blue signal is input, the output of the black correction circuit 156a is $B_{in}(i)-DK(i)=B_{out}(i)$ (referred to as black correction mode). Furthermore, "i" refers to a variable representing the image signal which is read by the i-th optical conversion device of the CCD sensor 101.

Similarly, in the case where the green $G_{in}$ or red $R_{in}$ signal is input, the similar control is performed in the block 77aG or 77aR. In this way, the image signals $B_{out}$, $G_{out}$, and $R_{out}$ on which the black correction is performed in each color component is output.

Furthermore, the control signal of each selector gate and the gate signals 601–605 for the above-described controls are formed under control of a CPU (not shown) as the output of the latch 85a is allotted as an I/O of the CPU. The CPU is enabled to access the RAM 78a when the side B is selected by the selectors 82a, 83a, and 86a.

Figure 8:
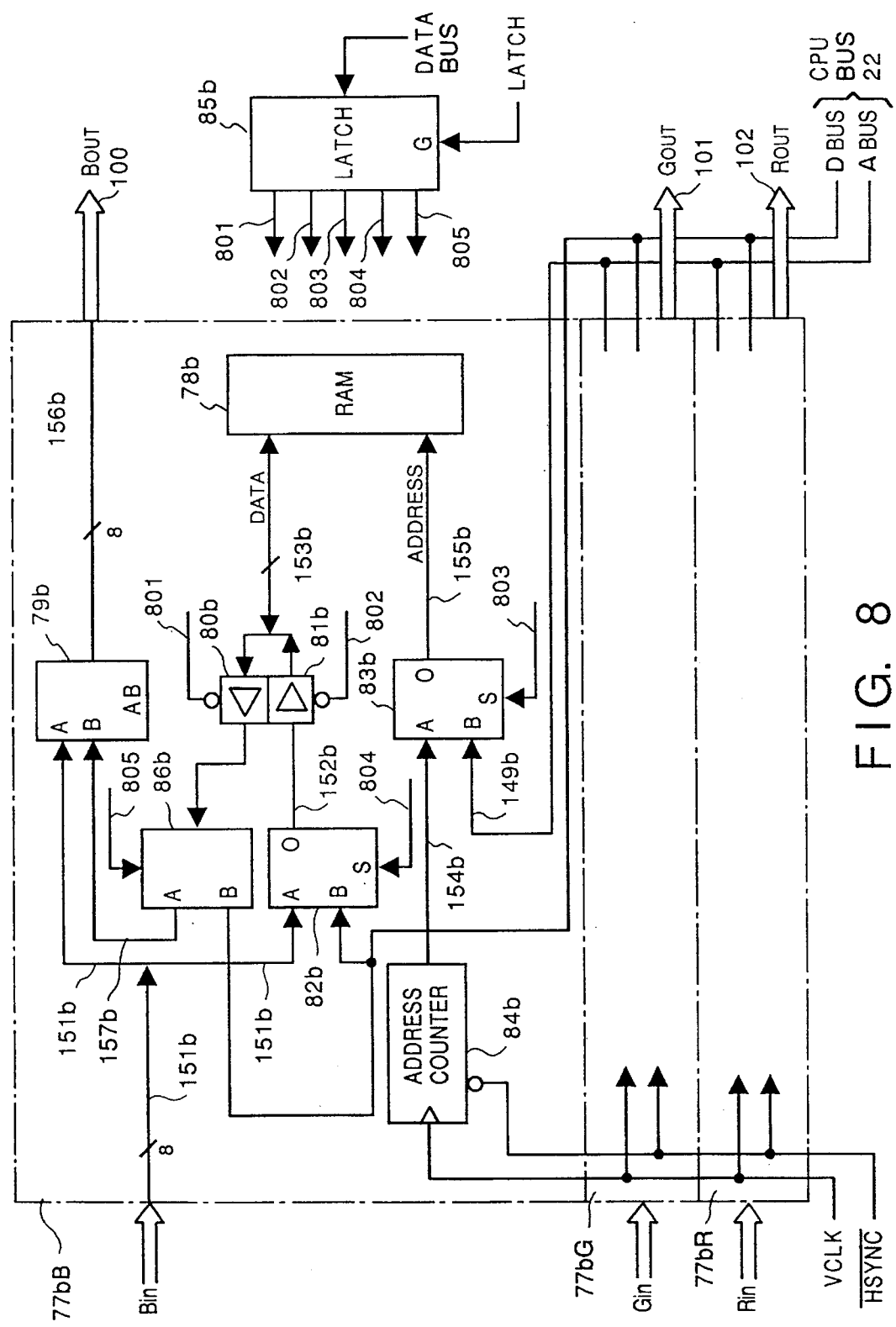
FIG. 8 is a block diagram illustrating a white correction circuit of the digital copier according to the present embodiment.

Then, accompanying with FIG. 8, the white level correction (shading correction) in the black/white correction circuit 107 is described. This correction is to correct variation in the light system, optical system, and sensitivity of the sensor on the basis of white color data when the original image scanning unit is moved to a position to irradiate the white board, which when read has an even density. The basic construction of white correction circuit is shown in FIG. 8. The basic construction of this circuit is similar to that of the black correction circuit in FIG. 6. In the black correction circuit, the correction is performed in a manner such that a black image signal is stored in the RAM 78a and the value is output to the subtracter 79a. The correction is thus performed by subtraction. The difference in the white correction circuit is that the white data is stored in the RAM 78b, and the value is output to the multiplier 79b and multiplied by the image signal. Since the operation in the other parts are similar to those of the black correction, an explanation is omitted.

The operation of the white color correction is now described. When the CCD 101 for reading the original image locates at the reading position for reading the white board (home position), the exposure lamp (not shown) is lit prior to the operation of either duplication or reading, and the white board is read. The image data of the white level having an even density which was read in this way is stored in the correction RAM 78b which has memory capacity capable of storing the pixel data for one line. For example, if the main scanning direction has a width corresponding to the length of the longitudinal side of A4 size paper, 4752 (16×294 mm) pixels at 16 pel/mm, at least 4752 bytes, are necessary for the memory capacity of the RAM 78b.

Figure 9:
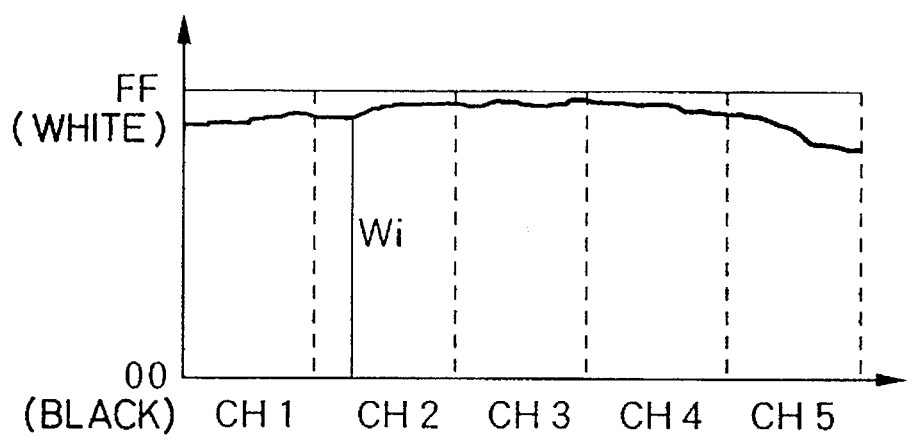
FIG. 9 is a diagram illustrating the concept of the white correction in the white correction circuit of the digital copier according to the present embodiment.
Figure 10:
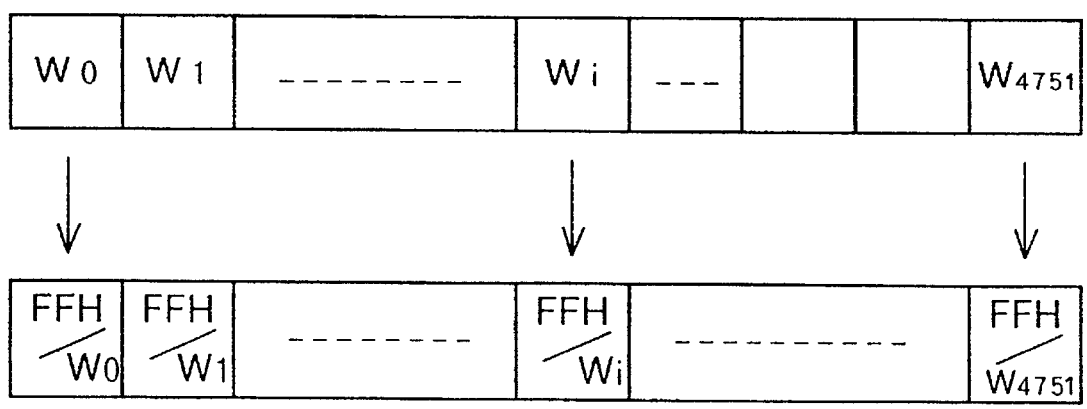
FIG. 10 is a format diagram of data for a white board in the white correction circuit of the digital copier according to the present embodiment.

FIG. 9 illustrates the image signal when the white board was read. As shown in FIG. 9, if the white color data is $W_i$ (i=0–4751) of the i-th pixel, the white color data from the white board is stored in every pixel as shown in FIG. 10.

Then, to the white color data $W_i$ of the i-th pixel, the corrected data $D_0$ to the reading value $D_i$ of the i-th pixel $D_i$ of an ordinary image is obtained by $D_0=D_i \times FF_H/W_i$. The "$FF_H$" indicates "255" in hexadecimal notation.

Then, the CPU outputs the gate signals which open the gates 80b and 81b to the latch circuit 85b and the selection signals 801–805 which select the B input in the selectors 82b, 83b, and 86b. Thus, the RAM 78b can be accessed by the CPU.

Figure 11:
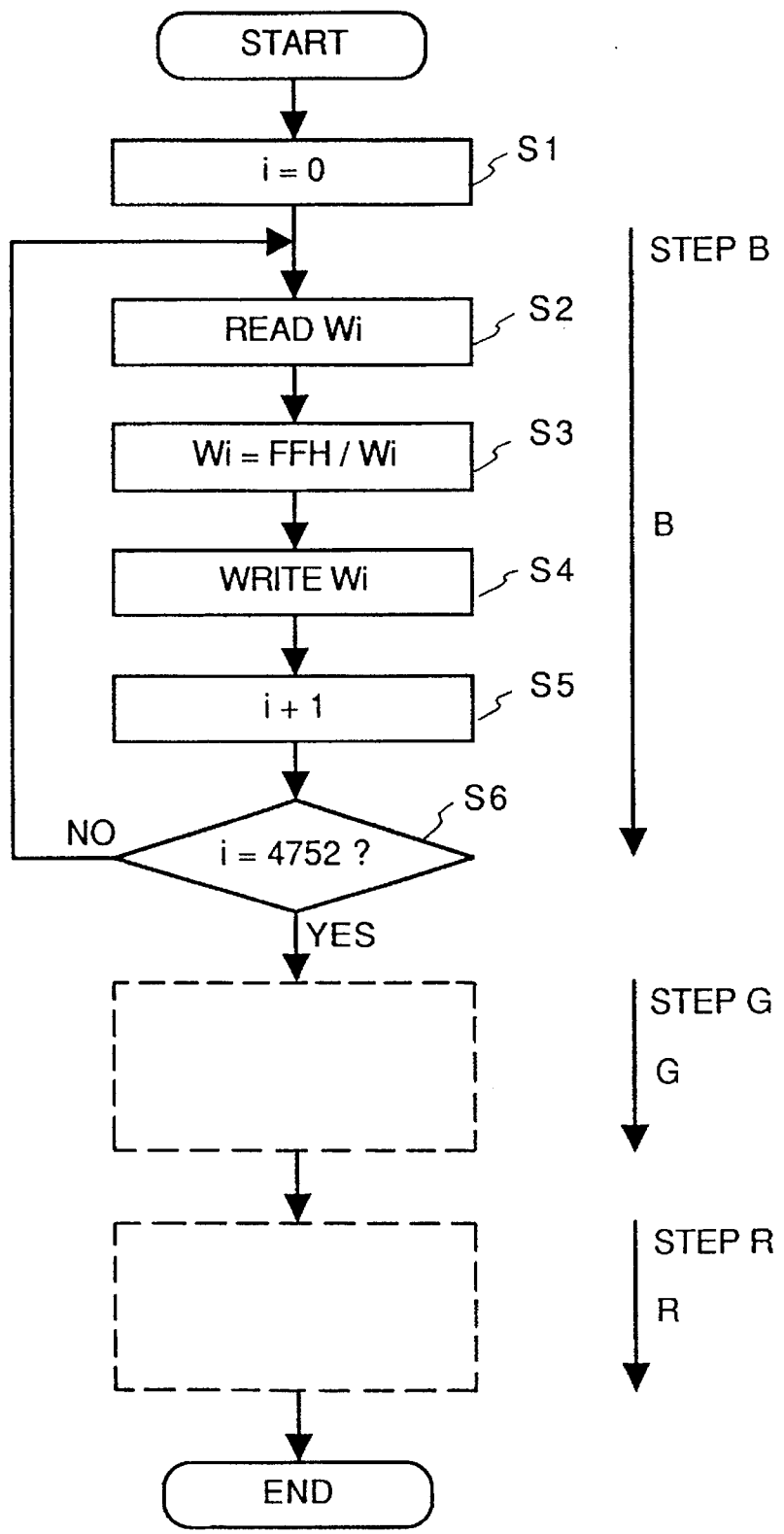
FIG. 11 is a flowchart illustrating the procedure of white correction in the white correction circuit of the digital copier according to the present embodiment.

FIG. 11 is a flowchart illustrating the procedure for forming the white correction data and storing the data in the RAM 78b.

First, in step S1, the pointer i is set to "0" and the white color data $W_i$ which is stored in the RAM 78b is read. In step S2, the operation of $FF_H/W_i$ is performed on the white color data $W_i$. The operations such as $W_0=FF_H/W_0$, $W_1=FF_H/W_1$, . . . are consecutively performed and the white color data which is stored in the RAM 78b is converted, as in FIG. 10. In this way, when the image data processing of the blue component to the 4752 pixels in the main scanning direction of the color component image (Step B in FIG. 11) is completed, similarly the processings for the green component (Step G) and red component (Step R) are consecutively performed. Thus, the white correction data is stored in the RAM 78 corresponding to each circuit of 77bB, 77bG, and 77bR in FIG. 8.

Then, the gate 80b is opened by the gate signal 801 and the gate 81b is closed by the selection signals 802 so that the operation $D_0=D_i \times FF_H/W_i$ is performed on the input original image data $D_i$. The side A is selected by the selection signals 803 and 805 in the selectors 83b and 86b. In this way, the counter data $FF_H/W_i$ which was read out of the RAM 78b is input to the multiplier 79b through the signal path 153b→157b. Then, the quotient of $FF_H/W_i$ is multiplied by the original image data 151b which was input from the A input terminal and the product $(D_i \times FF_H/W_i)$ is obtained and output.

As described above, variations, e.g. black level sensitivity in the image input device, dark current of the CCD 101, light quantity in the optical path where light is input to the sensor, and black and white levels which are generated on the basis of the facts of white level sensitivity, are corrected. The image data $R_{out}121$, $G_{out}122$, and $B_{out}123$ (FIG. 1A) which are corrected in each color by the black and white corrections are obtained over the main scanning direction from the black correction signals $B_{out}$, $G_{out}$, and $R_{out}$ and the white correction outputs $B_{out}100$, $G_{out}101$, and $R_{out}102$.

The image data $R_{out}121$, $G_{out}122$, and $B_{out}123$ on which the black and white corrections have been performed are input to the brightness signal generator 108 and the color discrimination circuit 109.

Figure 12:
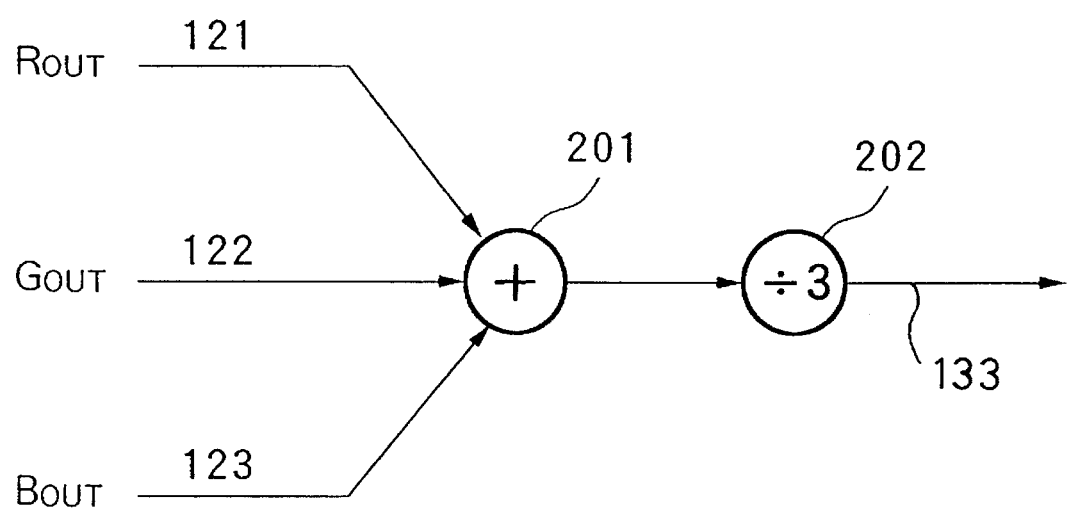
FIG. 12 is a diagram of the brightness signal generator of the digital copier according to the present embodiment.

The brightness signal generator 108 standardizes the filter image which was read by the CCD sensor 101 and forms an ND image. Refer to FIG. 12 for an explanation of the above-described operation. The input image data $R_{out}121$, $G_{out}122$, and $B_{out}123$ are added by the adder 201, and the sum is divided by three by the divider 202, and the average is obtained and output as the brightness signal 133.

The color discrimination circuit 109 is now described. The present embodiment utilizes a hue signal as a color discrimination signal. This enables the performance of an accurate color discrimination when the comparing colors are the same, and the intensity or saturation is different from one other. The outline of the color detection method is first described.

Each of the input R, G, B data ($R_{out}$, $G_{out}$, and $B_{out}$) is 8 bits having the information of $2^{24}$ colors in total. If such information carrying considerably large data is used as is, the apparatus must be expensive because of the size of the circuit. In order to reduce the cost, the reduction of the circuit size can be achieved in the following way.

Figure 13:
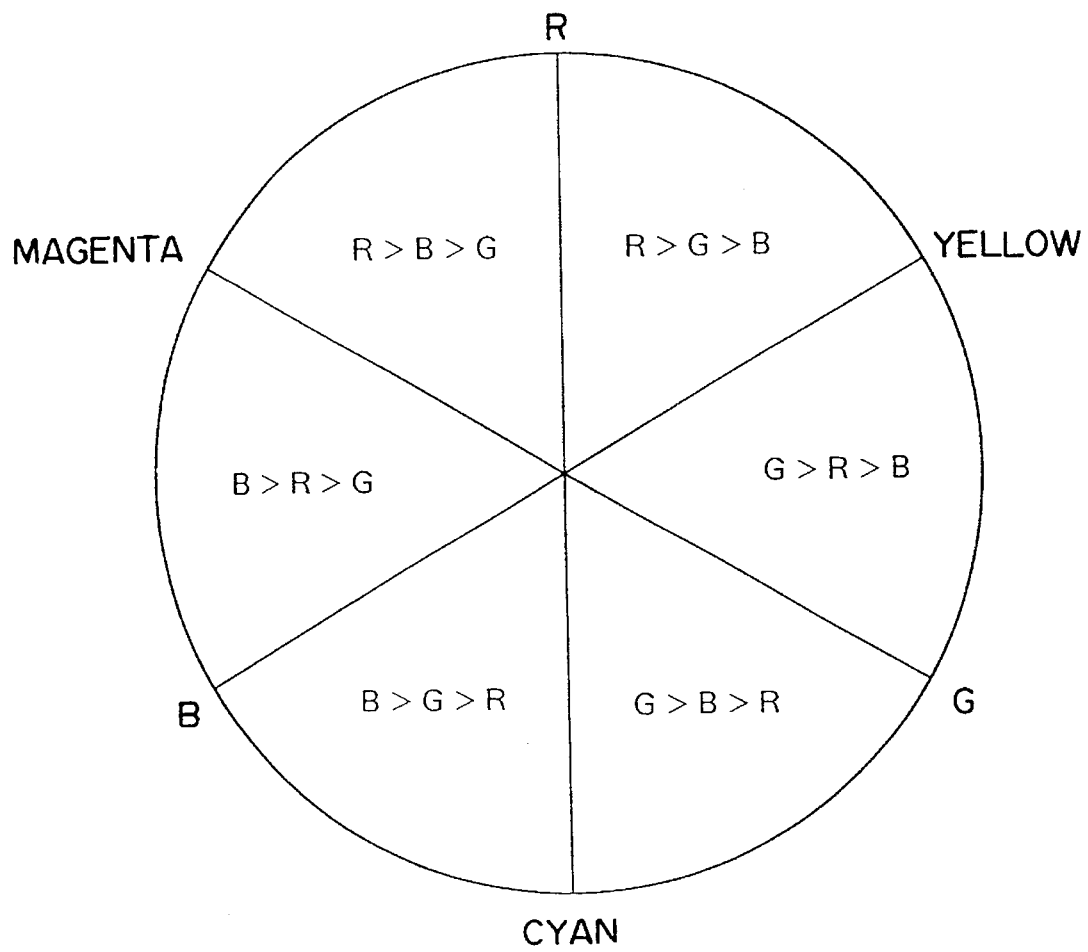
FIG. 13 is a diagram illustrating a color space where color discrimination is performed by hue.

As described above, the present embodiment utilizes the hue signal. Precisely speaking, the hue according to the present embodiment is different from the ordinary hue, however, it is here referred to as "hue signal" for reasons of convenience. It is known that the color space can be expressed in 3 dimensions comprising saturation, hue, and intensity such as Munsell's cube. First, it is necessary that the R, G, B data in 3-dimensions is converted to 2-dimensional data. In general, since the common area of the R, G, B data, that is, the minimum value min (R, G, B) of the R, G, and B indicates an achromatic color component, the min (R, G, B) is subtracted from each R, G, B data and the 3-dimensional input color space is converted into the 2-dimensional color space by utilizing the rest of information as chromatic color components. The plain ring 0°~360° to which the 3-dimensional space is converted is divided into six as shown in FIG. 13. The hue is obtained by the comparison of R, G, B data such as the information of R>G>B, R>B>G, G>B>R, G>R>B, B>G>R, and B>R>G, the maximum and middle values in the inputted R, G, B data, and the LUT (look up table).

Figure 14:
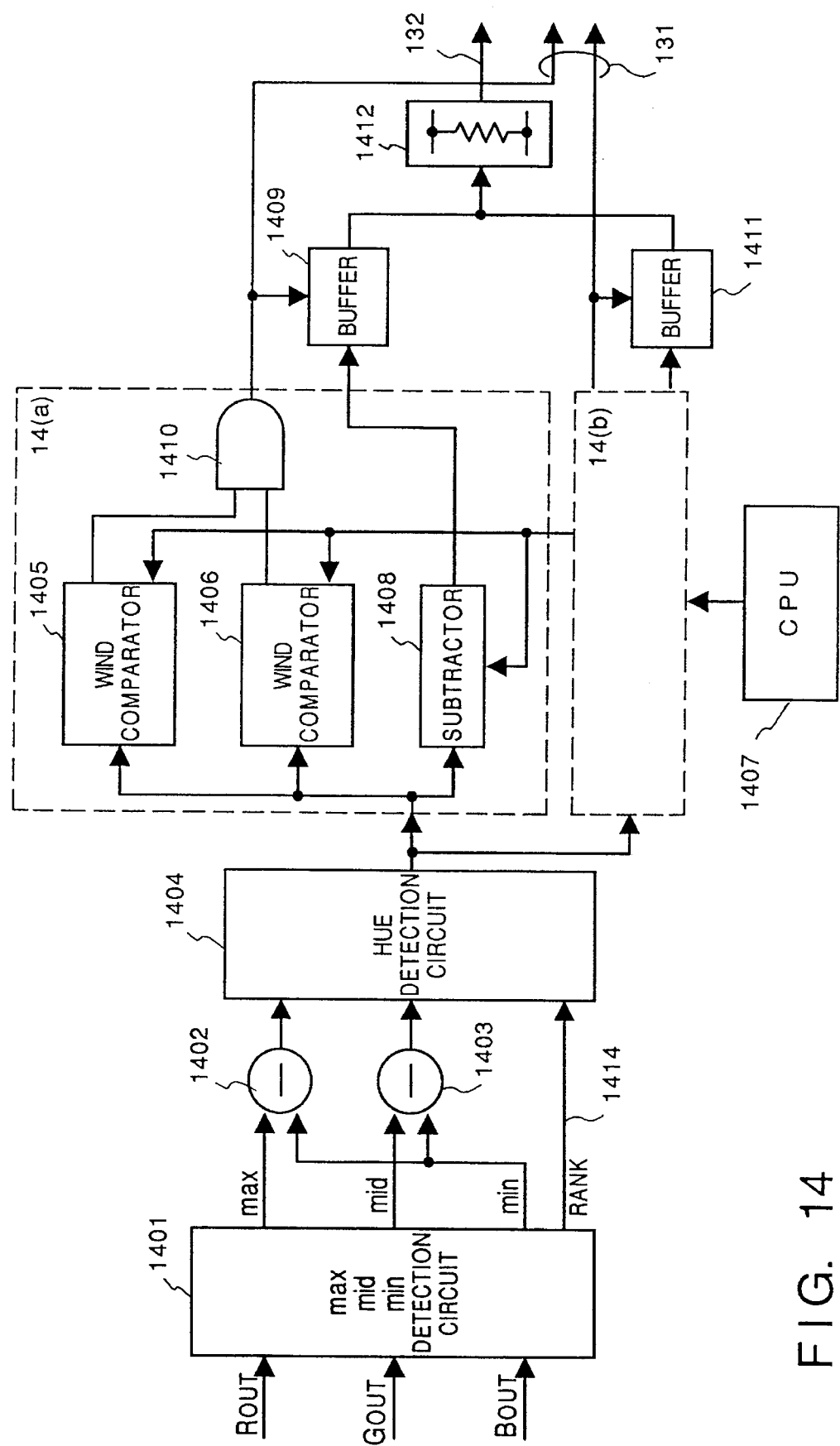
FIG. 14 is a block diagram illustrating the construction of a color discrimination circuit of the digital copier according to the present embodiment.

Then, the actual operation of the color discrimination circuit 109 is explained along with FIG. 14.

First, the detection circuit 1401 compares the sizes of $R_{out}$, $G_{out}$, and $B_{out}$ data on which the black/white corrections have been performed. In the circuit 1401, each input data is compared by the comparator and outputs a maximum (max) value, middle (mid) value, or minimum (min) value according to the result of comparison. The output value of the comparator is determined and output as the rank signal 1414. The min value is subtracted from the max and mid values by the subtracters 1402 and 1403 so that the achromatic color components are reduced from the max and mid values. The subtracted value is input into the hue detection circuit 1404 with the rank signal 1414.

The hue detection circuit 1404 comprises the storage device capable of random access such as RAM or ROM. In the present embodiment, the hue detection circuit 1404 comprises the look up table using ROM. In the ROM, the values corresponding to the angles of plain are stored in advance as shown in FIG. 13 and the corresponding hue value is output from the input rank signal 1414, (max−min) value, and (mid−min) value. The hue value outputted in this way is then input into the window comparators 1405 and 1406.

The value set in the window comparators 1405 and 1406 is the hue data value corresponding to the hue value which is set to the offset value by the CPU in the case where the hue value of the color data to be patternized by the data input means (not shown) is input. If the value which was set in the comparator 1405 is $a_1$, it is arranged so that, in the case where (hue data)>$a_1$, "1" is output from the comparator 1405 to the hue data which is input from the hue circuit 1404. If the value set in the comparator 1406 is $a_2$ ($a_1$<$a_2$), it is arranged so that, in the case where (hue data)<$a_2$, "1" is output from the comparator 1406. In this way, in the case where $a_1$<(hue data)<$a_2$, "1" is output from the AND gate 1410.

Furthermore, the CPU 1407 sets the middle value ($a_1$+$a_2$)/2 of the two values ($a_1$ and $a_2$), which are set in the window comparators 1405 and 1406, in the subtracter 1408. Then, the output value 131 from the hue detection circuit 1404, and the difference value (absolute value) between the output value 131 from the hue detection circuit 1404 and the middle value of the color discrimination range which was obtained by the subtracter 1408 is obtained and output as the shifted distance 132. The difference value is input into the buffer 1409 and controlled by the output from the AND circuit 1410. That is, in the case where the output of the AND circuit 1410 is "1", the stored difference value is output from the buffer 1409 as the shifted distance 132. On the other hand, in the case where the output of the AND circuit 1410 is "0", where $a_1$<(hue data)<$a_2$ is not satisfied, the output of the buffer 1409 becomes high impedance.

In FIG. 14, the section 14(a) which is enclosed by a dotted line corresponds to the construction of the circuit 14(b). According to the present embodiment, it is set so that two colors can be discriminated. If colors to be discriminated are added, the section which is enclosed by a dotted line 14(b) needs to be added. For the latter description, the sections which are enclosed by a dotted line are respectively referred to as 14(a) and 14(b). Furthermore, to be described later along with FIG. 15, the color discrimination signal 131 is 5 bits in order to discriminate five colors.

The outputs of the buffer 1409 and buffer 1411 are common. As understood from this, the CPU 1407 needs to control values which are set in the window comparator so that the outputs of the buffer 1409 and buffer 1411 will not be active at the same time. In other words, it is set so that the window ranges in the sections enclosed in the dotted line should not overlap. The common outputs of the buffers 1409 and 1411 are pulled up by the resistance array 1412. This is because the output level of the shifted distance 132 is to be at a high level in the case where the outputs of the AND circuit 1410 of the color detection circuits 14(a) and 14(b) are all "0". That is, in the case where the input R, G, and B image signals cannot be discriminated by any colors, the data in which all the bits are "1" are output as the shifted distance 132.

Figure 15:
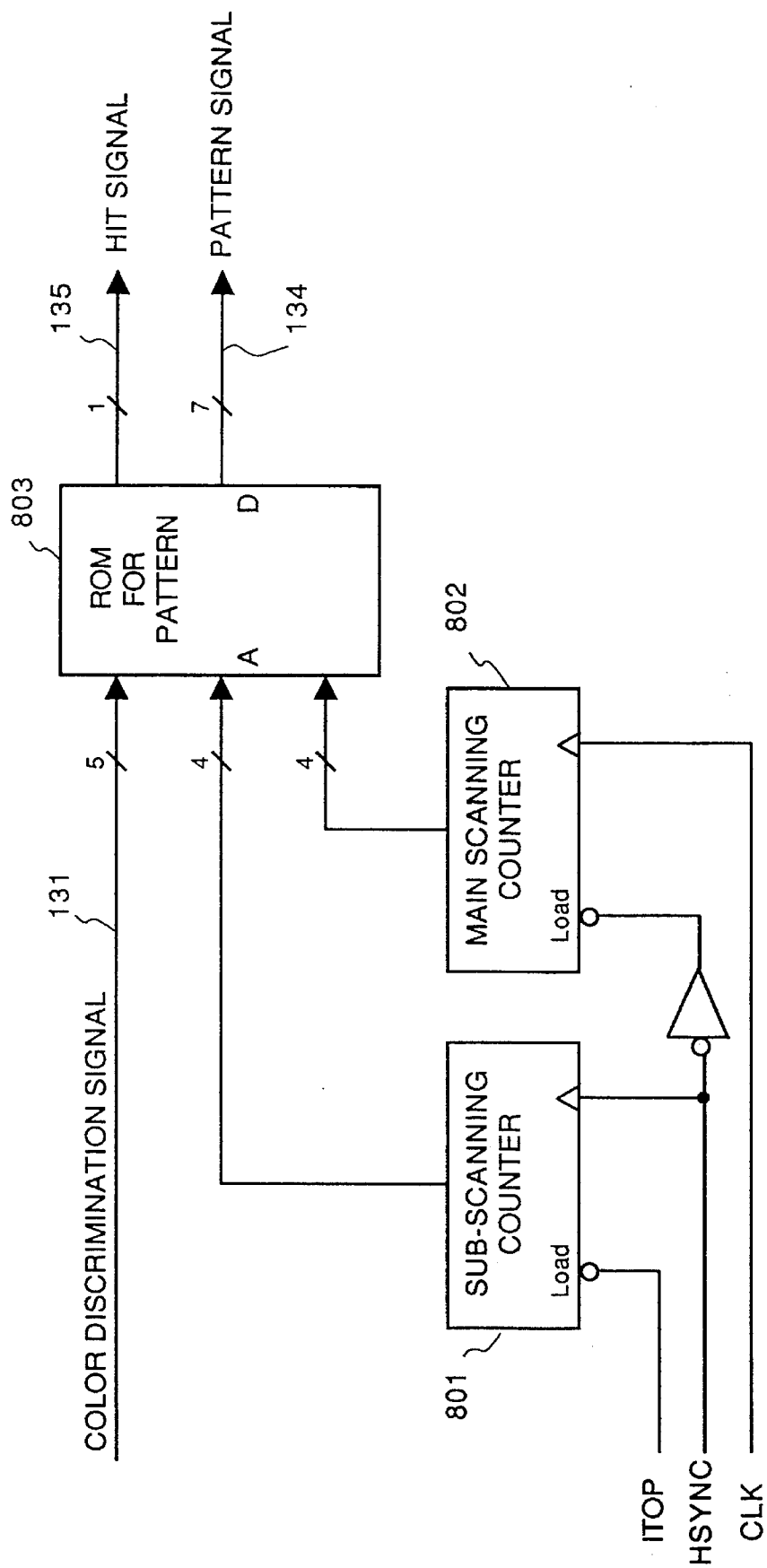
FIG. 15 is a block diagram illustrating the construction of a pattern generation circuit of the digital copier according to the present embodiment.
Figure 16A:
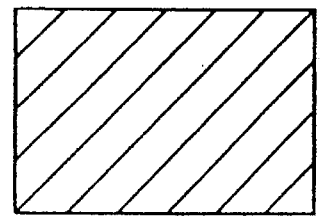
FIGS. 16A–16F are the color patterns corresponding to each color which is output from the pattern generation circuit of the digital copier according to the present embodiment.
Figure 16B:
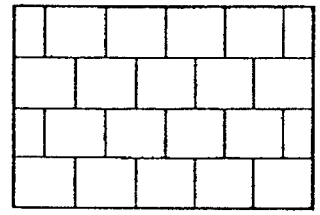
Figure 16C:
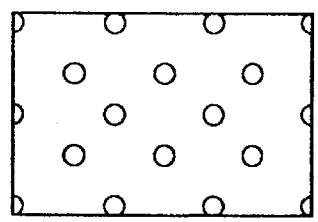
Figure 16D:
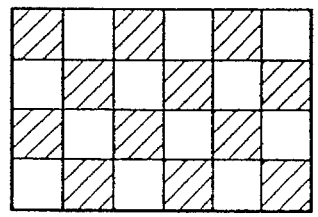
Figure 16E:
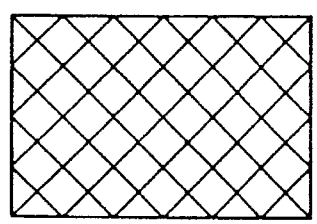
Figure 16F:
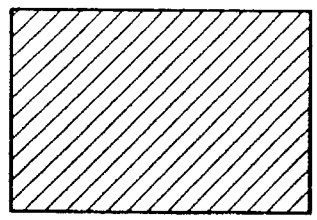

Then, the construction of the pattern generation circuit 110 is described along with FIG. 15.

In the ROM 803 for pattern generation, the dot pattern data corresponding to each color is written in advance as shown in FIGS. 16A–16F. Each pattern is set 16×16 dot as one pattern. The ROM 803 for pattern selects the pattern data according to the color discrimination signal 131 which is input from the color discrimination circuit 109. The pattern data generation processing is performed by repeatedly reading the data to the main scanning direction and sub-scanning direction. The main scanning counter 802 synchronizes with the horizontal synchronizing signal HSYNC and is operated when the video clock CLK is counted. The sub-scanning counter 801 synchronizes with the ITOP signal and is operated when the horizontal synchronizing signal HSYNC is counted.

The outputs of the counters 801 and 802 are both 4 bits and the 5-bit color discrimination signal 131, 13 bits in total, are input as the address of the ROM 803 for patterns. In other words, it is set up that the 32 ($2^{13} \div (2^4 \times 2^4) = 2^5$) kinds of the 16 dot×16 dot pattern data can be generated corresponding to the (kind of) read color.

The output data from the ROM 803 for patterns is 8 bits and the most significant bit MSB is utilized as the control signal (HIT signal 135) in the pattern composite circuit 111 which will be described later. Therefore, in the ROM 803 for patterns, the data that the MSB is normally "0", but "1" when the pattern is output as it is written in.

Of course, the ROM 803 for patterns can be replaced by RAM. If the RAM is used, the capacity and bit allotment of an address are similar to these of the ROM.

Then, the construction of the pattern composite circuit 111 is described.

The shifted distance 132 which was output from the color discrimination circuit 109 is inverted by the inverter circuit 1004 and input into the pattern controller 1001. The pattern signal 134 which was output from the pattern generation circuit 110 is converted to the density signal and output. For example, suppose that the shifted distance 132 is the 8 bit data, and the pattern controller 1001 has eight AND circuits 1003 and each bit of the shifted distance is input into each AND circuit. On the other hand, the pattern signal 134 of 1 bit is input into the other input terminals of each AND circuit. The AND circuit 1003 is opened according to the value of the shifted distance 132 and 1 bit of the pattern signal 134 is converted to the 8 bits brightness signal. Thus, the pattern information 1005 having the brightness according to the shifted distance 132 is output from the patten controller 100.

Furthermore, the brightness information 133 which is input from the brightness signal generator 108 is output from the selector 1002 according to the HIT signal 135 which is output from the pattern generation circuit 110. That is, in the case where the HIT signal 135 is "0" (the pattern signal 134 is not output), the brightness information 133 is selected and output. On the other hand, in the case where the HIT signal 135 is "1", the selector 1002 selects and outputs the pattern information 1005 which is output from the pattern controller 1001. In this way, the HIT signal 135 is a signal indicating whether or not the color is discriminated. If the color is not discriminated by any color (HIT="0"), the brightness information 133, that is, the brightness information of an input image signal is output as it is. On the other hand, if the color is discriminated (HIT signal="1"), the patten information 1005 having the brightness information which according to the shifted distance 132 is output.

Figure 18:
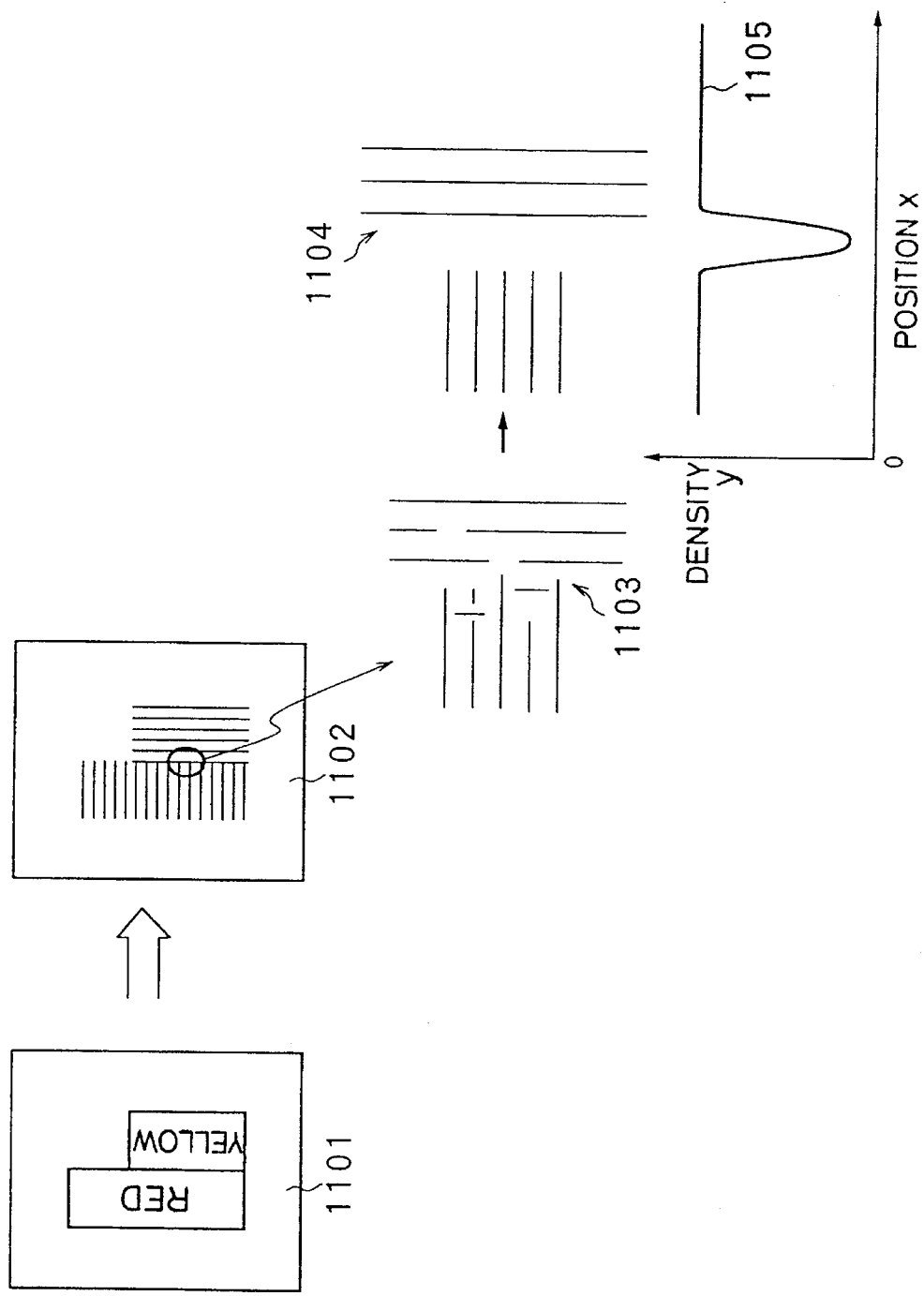
FIG. 18 is a diagram for explaining the effect in the color border area in the digital copier according to the present embodiment.

Then, the actual processing is described along with FIG. 18.

In the drawing the numeral 1101 refers to an actual original image and the rectangles in red and yellow are described as the drawing. In the conventional embodiment that the hue of the original image is discriminated and patternized, a color discrimination error is caused at the border of red and yellow. This case is described referring to the drawings 1102 and 1103. The drawing 1102 illustrates the case where the color is patternized and printed and the drawing 1103 is an enlarged drawing. In order to simplify the drawing, the illustrated patterns in FIG. 18 are different from the color patterns indicated in FIGS. 16A–16F. As apparent from the drawing 1103, the patterns for red and yellow coexist at their border and the output becomes not clear as a result.

In contrast, the numerals 1104 and 1105 indicate the result obtained by the present embodiment. The obscurity on the output which was caused by the coexistence of the patterns is eliminated by reducing the detection density at the border of the colors where the color discrimination error occurred.

The graph 1105 indicates the change of the pattern density in the pattern output which is indicated by the drawing 1104. In the graph, the y-axis represents density and x-axis represents the position information of the pattern which corresponds to the pattern output 1104. As apparent from this, since the density y is lowered around the border of the two colors, the coexistence of patterns is de-emphasized.

Then, the LOG convertor 112 is described. The image data, which was composited by the pattern composite circuit 111, is input to the LOG convertor 112 as shown in FIG. 1 so that the brightness/density conversion is performed and converted into the density signal. In the LOG convertor 112, the brightness/density conversion is performed by the look up table using ROM. The signal which was converted into a density signal in the LOG convertor 112 is output to a monochrome printer where the image is formed (e.g. laser beam printer).

[Second Embodiment (FIG. 19)]

The method where the image information is forcefully changed to black in the part where the distance shifted from the center of the discrimination range is larger than a predetermined level is now described.

Figure 19:
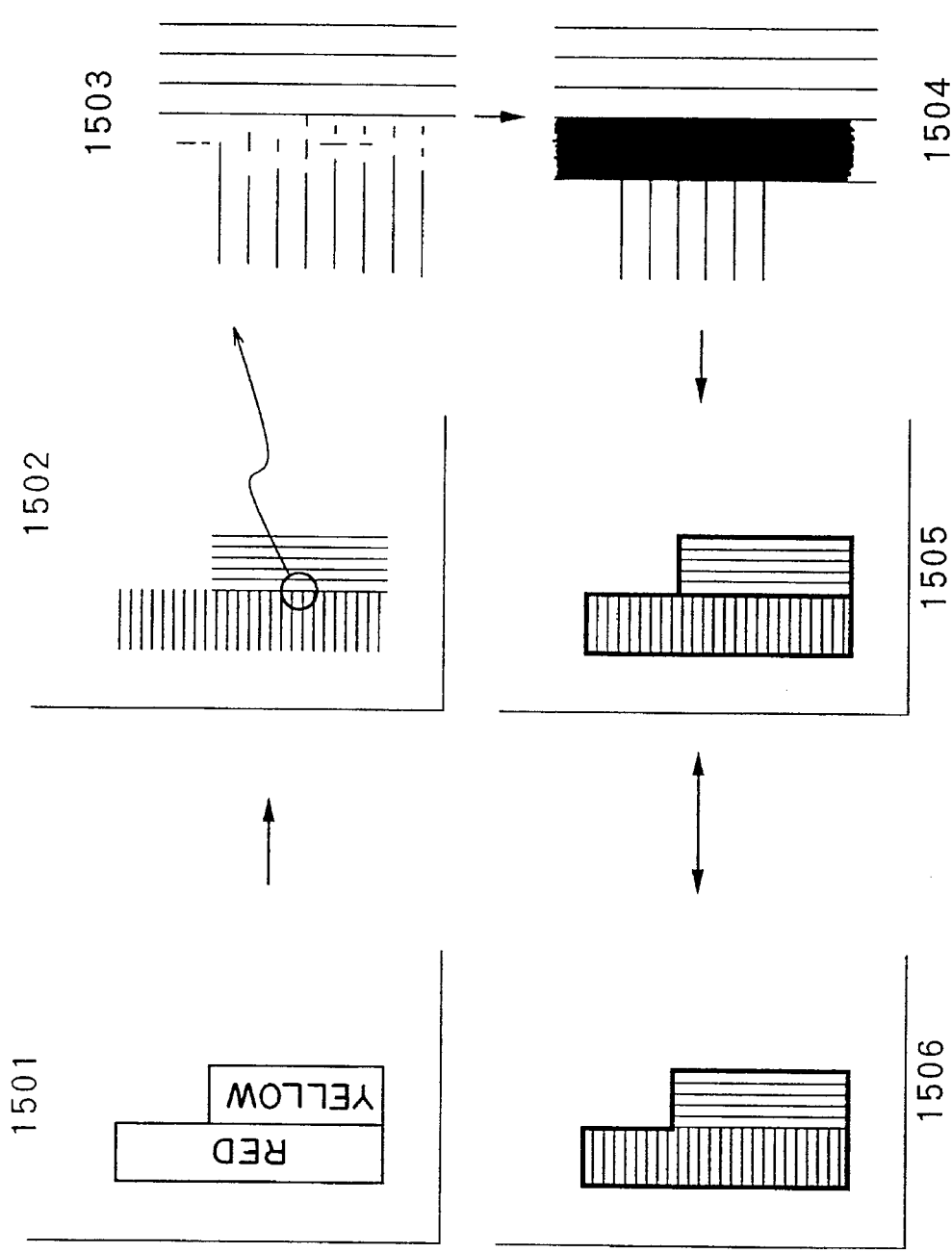
FIG. 19 is a diagram for explaining the edge adding effect in the digital copier according to the present embodiment.

First, the effect of the present method is described along with FIG. 19.

The drawing 1501 represents the color original image. The color separation is performed on the original image by the hue discrimination and each color is patternized. The result is shown in the drawing 1502. As understood from this drawing, red is expressed in lateral stripe and yellow is in vertical stripe.

The drawing 1503 is the drawing that the border part is enlarged. At the border of the colors, the color discrimination error has occurred and the lateral stripe pattern and the vertical stripe patten are partially overlapped.

As described in the first embodiment, in the case where the shifted distance from the center of the discrimination range is larger than the predetermined value, when the processing to reduce the brightness (to increase the density) is performed, the border where the color discrimination error occurred becomes black as shown in the drawing 1504. The drawing 1505 represents the whole image in this method. The black edge surrounds the areas of each color, and thus, the clear output image can be obtained.

The drawing 1506 illustrates the conventional method that the edge of the brightness information is extracted and it is emphasized. However, in this case, since there is little difference between red and yellow, an edge is not formed at the border of colors.

Thus, in comparison with that the conventional method that an edge extraction and edge addition on the basis of brightness information, the advantage of the present embodiment is that an edge is added if a hue is changed.

Figure 20:
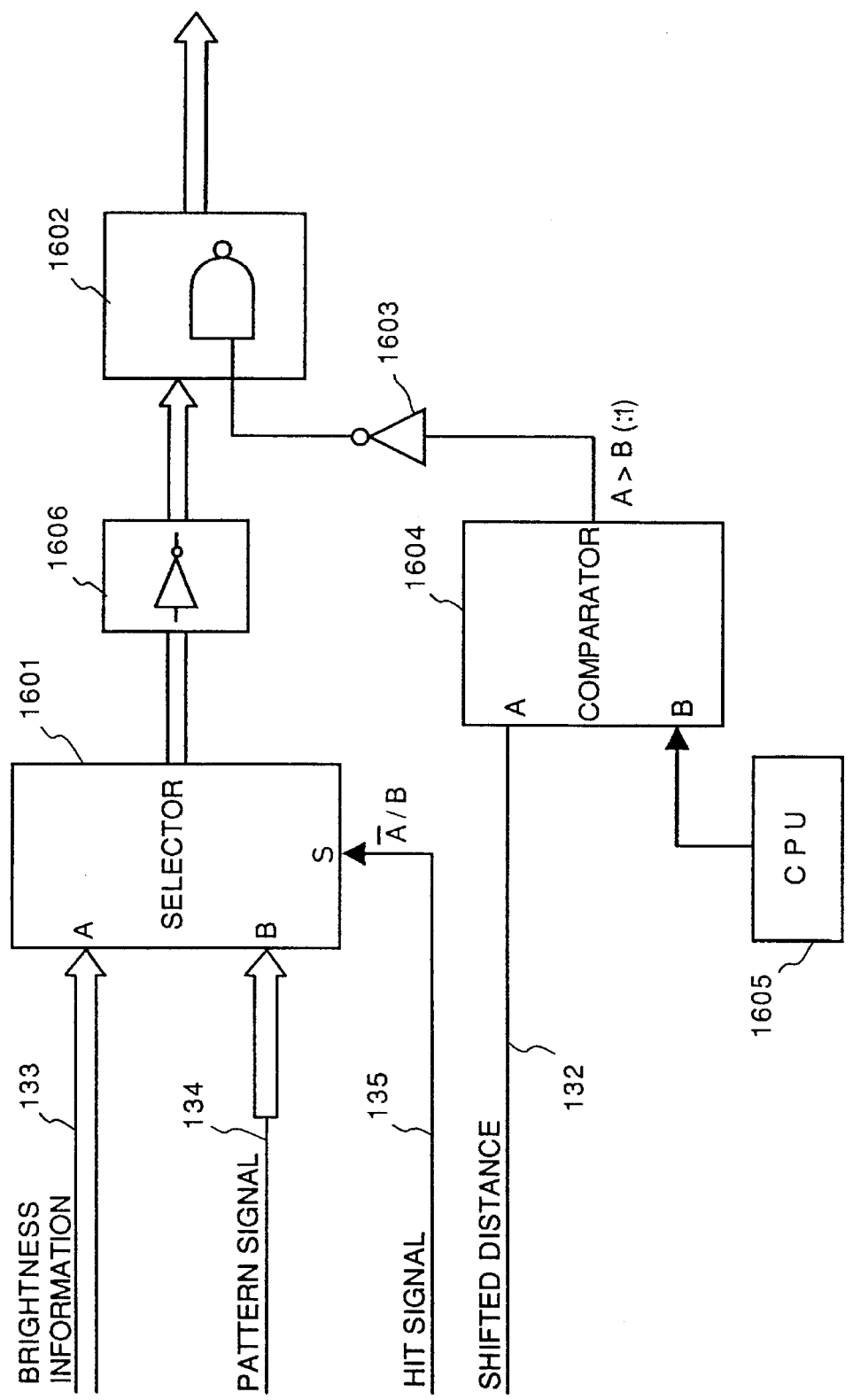
FIG. 20 is a block diagram illustrating the construction of the pattern composite circuit of the digital copier according to the other embodiment.

Now, the difference between the first embodiment and the second embodiment is described along with FIG. 20.

Figure 17:
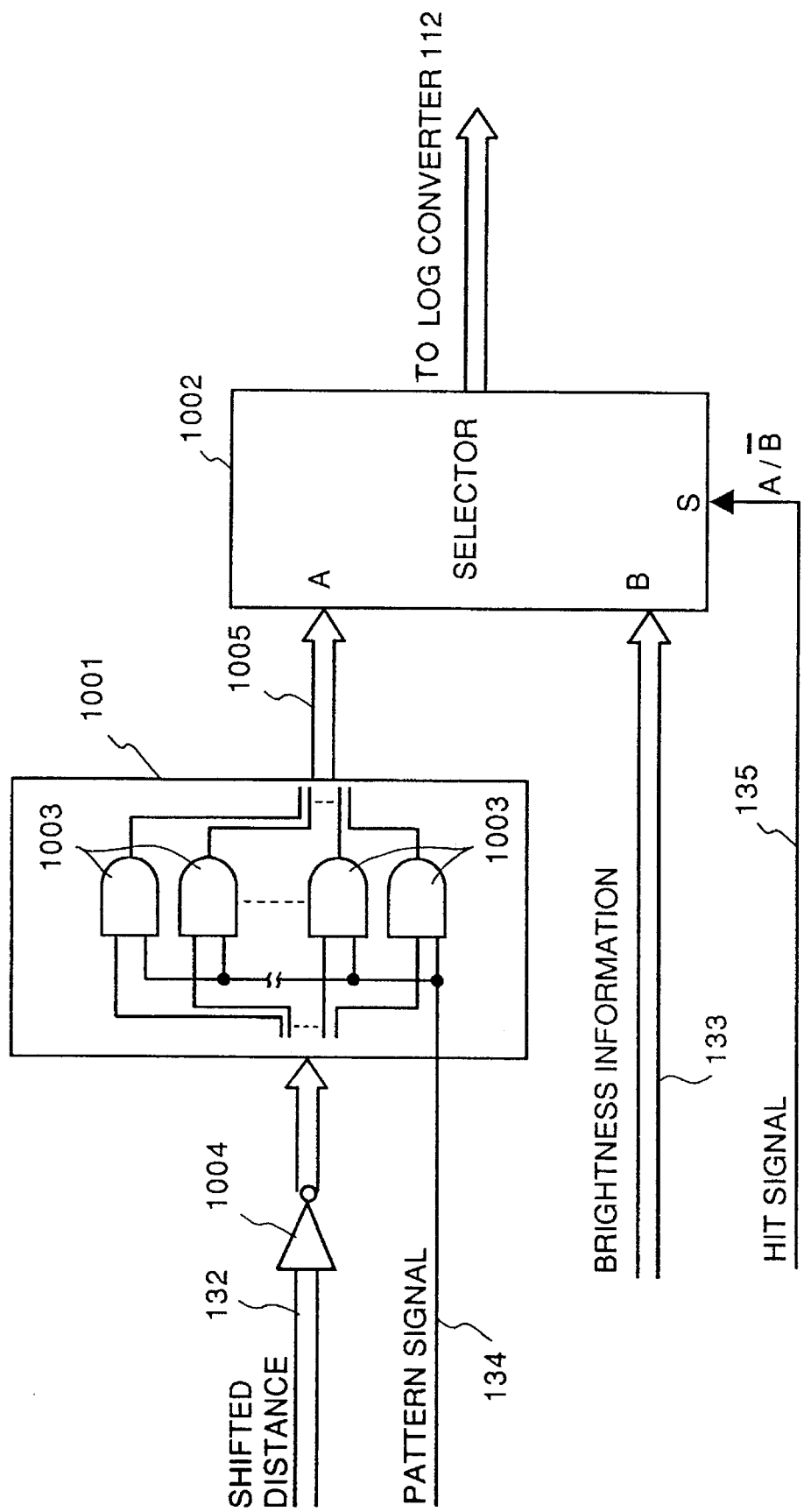
FIG. 17 is a block diagram illustrating the construction of the pattern composite circuit of the digital copier according to the present embodiment.

FIG. 20 is a block diagram illustrating the construction of the pattern composite circuit according to the second embodiment, which corresponds to the pattern composite circuit 111 as shown in FIG. 17.

The brightness signal 133 which is generated in the brightness signal generator 108 and the pattern signal 134 which is generated in the pattern generation circuit 110 are selected by the selector 1601 according to the HIT signal 135. That is, the selector 1601 selects the pattern signal 134 in the case where the color is discriminated, while in the case where the color is not discriminated, the brightness information 133 is selected and output.

On the other hand, the shifted distance 132 which is generated from the color discrimination circuit 109 is compared with the threshold which is set by the CPU 1605 in the comparator 1604. In the case where the shifted distance 132 is larger than the predetermined threshold (A input>B input), "1" is output from the comparator 1604. The result of comparison is inverted by the inverter 1603 and the output of the selector 1601 is controlled in the NAND gate circuit 1602. Thus, in the case where the shifted distance 132 is larger than the threshold set by the CPU 1605, the data "1" is output from the NAND circuit 1602 and the brightness information becomes "1", that is, the image is blackened. On the other hand, in the case where the shifted distance 132 is less than the threshold, the pattern signal 134 or the brightness information 133 output from the selector 1601 is selected and output to the LOG convertor 112.

Thus, for the pattern composite circuit 111 according to the aforementioned embodiment, by adopting the pattern composite circuit shown in FIG. 20, the effect of adding edges can be obtained as shown in FIG. 19.

The present invention can be applied to a system comprising a single device or a plurality of devices. The present invention can also be applied to the case where the program executing the precessing which is directed by the present invention is supplied to a system or an apparatus.

As described above, according to the present embodiments, the clear output is obtained because of reduction of the pattern density at the color border part of a plurality of colors and the color discrimination error is eliminated in a manner such that the color of the image data is discriminated and the distance from the center of the discrimination range of the input image data is reflected on the density of the pattern data expressing the discriminated color.

Furthermore, the shifted distance can be discriminated at multiple-stages and the density can be changed at the multiple-stages according to the shifted distance.

Furthermore, the density after the LOG conversion can be changed instead of the brightness signal as in the aforementioned embodiment.

Furthermore, the processing can be arranged according to the shifted chroma rather than the shifted hue.

Furthermore, it is not necessary that an extraction of hue is performed in the R, G, B space. It can be performed on the plain, for example, a*b* plain of the L*, a*, b* space.

As described above, according to the present invention, it is prevented that patterns coexist at the color changing point in the original image and the color of the original image is patternized and output.

As many apparently widely different embodiments of the present invention can be made without departing from the spirit and scope thereof, it is to be understood that the invention is not limited to the specific embodiments thereof except as defined in the appended claims.

What is claimed is:

1. An image processing apparatus comprising:
    input means for inputting a color image;
    color discrimination means for discriminating a color of the color image input by said input means;
    pattern generation means for generating a pattern image in accordance with the color discriminated by said color discrimination means;
    difference detecting means for detecting a color difference between the color discriminated by said color discrimination means and a predetermined color; and
    control means for controlling a density of the pattern image generated by said pattern generation means in accordance with the color difference detected by said difference detecting means.

2. The image processing apparatus according to claim 1, wherein the pattern image is defined corresponding to a predetermined color range.

3. The image processing apparatus according to claim 1, wherein said color discrimination means outputs a value of hue of the color image input by said input means and said pattern generation means generates a predetermined pattern image in a case where the value output by said color discrimination means is between a first value and a second value of hue.

4. The image processing apparatus according to claim 1, further comprising output means for outputting a black and white image if said color discrimination means discriminates a black and white portion of the color image and for outputting a pattern image generated by said pattern generation means if said color discrimination means discriminates a color portion of the color image.

5. The image processing apparatus according to claim 4, wherein said output means outputs an image to a printer unit.

6. The image processing apparatus according to claim 1, wherein said control means makes the density of the pattern image lighter in a case where the color difference detected by said difference detecting means is greater than a predetermined value.

7. The image processing apparatus according to claim 1, wherein said pattern image is a repeated pattern of a predetermined pattern.

8. The image processing apparatus according to claim 1, wherein said input means inputs a color image by using an image scanner.

9. The image processing apparatus according to claim 1, wherein said pattern image is a black and white image.

10. The image processing apparatus according to claim 1, wherein said pattern generating means generates the same patterns to all images having values of hue between a first and second value of hue.

11. The image processing apparatus according to claim 1, wherein said pattern generation means generates a first pattern image for an image having a first color and a second pattern image for an image having a second color.

12. An image processing method comprising the steps of:
    inputting a color image;
    discriminating a color of the color image;
    generating a pattern image in accordance with the color discriminated in said discriminating step;
    detecting a color difference between the color discriminated by said discrimination step and a predetermined color; and
    controlling a density of the pattern image generated by said generating step in accordance with the color difference detected by said detecting step.

13. The image processing method according to claim 12, wherein said pattern image is defined corresponding to a predetermined color range.

14. The image processing method according to claim 12, wherein in the discrimination step, a value of hue of the color image input by said input means is output and in the generation step, a predetermined pattern image is generated in a case where the value output by the discrimination step is between a first value and a second value of hue.

15. The image processing method according to claim 12, further comprising the step of:
    outputting a black and white image if black and white portion of the color image is discriminated; and outputting a pattern image generated by the generating step if a color portion of the color image is discriminated.

16. The image processing method according to claim 12, wherein the black and white image or the pattern image is output to a printer unit.

17. The image processing method according to claim 12, wherein in the controlling step, the density of the pattern image is made lighter in a case where the color difference detected by the detecting step is greater than a predetermined value.

18. The image processing method according to claim 12, wherein the pattern image is a repeated pattern.

19. The image processing method according to claim 12, wherein the color image is input by using an image scanner.

20. The image processing method according to claim 12, wherein the pattern image is a black and white image.

21. The image processing method according to claim 12, wherein in the generating step, the same patterns are generated for all of the images having values of hue between a first and second value of hue.

22. The image processing method according to claim 12, wherein in the generating step, a first pattern image is generated for an image having a first color and a second pattern image is generated for an image having a second color.

* * * * *

UNITED STATES PATENT AND TRADEMARK OFFICE
CERTIFICATE OF CORRECTION

PATENT NO. : 5,592,310
DATED : January 7, 1997
INVENTOR(S) : TAKASHI SUGIURA

Page 1 of 4

It is certified that error appears in the above-identified patent and that said Letters Patent is hereby corrected as shown below:

IN THE DRAWINGS

Sheet 14 of 20, FIG. 14, "SUBTRACTOR" should read --SUBTRACTER--.

COLUMN 1

Line 16, "Arts" should read --Art--.

COLUMN 2

Line 6, "a" should read --an--.

COLUMN 4

Line 27, "convertor" should read --converter--.
Line 39, "convertor." should read --converter.--.
Line 41, "a" should read --an--.
Line 47, "original" should read --the original--.
Line 48, "the color" should read --color-- and "filers." should read --filters.--.

COLUMN 5

Line 60, "sensors" should read --sensor devices--.

UNITED STATES PATENT AND TRADEMARK OFFICE
CERTIFICATE OF CORRECTION

PATENT NO. : 5,592,310

DATED : January 7, 1997

INVENTOR(S) : TAKASHI SUGIURA

It is certified that error appears in the above-identified patent and that said Letters Patent is hereby corrected as shown below:

COLUMN 6

Line 36, "which" should be deleted.

COLUMN 7

Line 9, "black" should read --a black--.
Line 10, "mode)." should read --mode")--.
Line 17, "is" should read --are--.
Line 32, "white" should read --the white--.
Line 42, "are" should read --is-- and "those" should read --that--.
Line 46, "locates" should read --is located--.
Line 63, "$D_o=D_i xEF_H/W_i.$" should read --$D_o=D_i xFF_H/W_i.$--.

COLUMN 8

Line 57, "other." should read --another.--.

COLUMN 9

Line 18, "inputted" should read --input--.
Line 41, "outputted" should read --output--.

UNITED STATES PATENT AND TRADEMARK OFFICE
CERTIFICATE OF CORRECTION

PATENT NO. : 5,592,310

DATED : January 7, 1997

INVENTOR(S) : TAKASHI SUGIURA

It is certified that error appears in the above-identified patent and that said Letters Patent is hereby corrected as shown below:

COLUMN 11

Line 12, "patten" should read --pattern--.
    Line 29, "patten" should read --pattern--.
    Line 30, "which" should be deleted.
    Line 37, "that" should read --where--.
    Line 57, "apparent" should read --is apparent--.
    Line 61, "convertor 112" should read --converter 112--.
    Line 63, "convertor 112" should read --converter 112--.
    Line 65, "convertor 112," should read --converter 112,--.

COLUMN 12

Line 1, "convertor 112" should read --converter 112--.
    Line 7, "forcefully" should read --forcedly--.
    Line 19, "that" should read --where--.
    Line 33, "that" should read --where--.
    Line 38, "that" should be deleted.
    Line 39, "that" should read --where-- and after
            "addition" add --are made--.

UNITED STATES PATENT AND TRADEMARK OFFICE
CERTIFICATE OF CORRECTION

PATENT NO. : 5,592,310

DATED : January 7, 1997

INVENTOR(S) : TAKASHI SUGIURA

It is certified that error appears in the above-identified patent and that said Letters Patent is hereby corrected as shown below:

COLUMN 13

Line 5, "convertor 112." should read --converter 112.--.
    Line 13, "precessing" should read --processing--.

COLUMN 14

Line 64, "step" should read --steps--.

COLUMN 15

Line 4, "claim 12," should read --claim 15,--.

Signed and Sealed this

Seventeenth Day of June, 1997

Attest:

BRUCE LEHMAN

*Attesting Officer*    *Commissioner of Patents and Trademarks*